United States Patent
Tanaka et al.

(10) Patent No.: US 7,951,497 B2
(45) Date of Patent: May 31, 2011

(54) FUEL CELL SYSTEM

(75) Inventors: Yoshikazu Tanaka, Kyoto (JP); Takashi Nishikawa, Nara (JP); Masataka Ozeki, Osaka (JP); Akinari Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 1565 days.

(21) Appl. No.: 10/542,171

(22) PCT Filed: Jul. 26, 2004

(86) PCT No.: PCT/JP2004/010992
§ 371 (c)(1),
(2), (4) Date: Jul. 12, 2005

(87) PCT Pub. No.: WO2005/011034
PCT Pub. Date: Feb. 3, 2005

(65) Prior Publication Data
US 2006/0051633 A1    Mar. 9, 2006

(30) Foreign Application Priority Data
Jul. 25, 2003    (JP) .................................. 2003-279838

(51) Int. Cl.
*H01M 8/04*    (2006.01)
(52) U.S. Cl. .......................... 429/429; 429/428; 429/436

(58) Field of Classification Search ........... 429/428–433
See application file for complete search history.

(56) References Cited

U.S. PATENT DOCUMENTS
2003/0194589 A1 * 10/2003 Pratt et al. ....................... 429/22

FOREIGN PATENT DOCUMENTS

| JP | 2002-190308 A | | 7/2002 |
|---|---|---|---|
| JP | 2002190308 A | * | 7/2002 |
| JP | 2002-352834 A | | 12/2002 |
| JP | 2003-061245 A | | 2/2003 |
| JP | 2004-213970 A | | 7/2004 |
| JP | 2004-278510 A | | 10/2004 |

* cited by examiner

*Primary Examiner* — Karie O'Neill Apicella
(74) *Attorney, Agent, or Firm* — Panitch Schwarze Belisario & Nadel LLP

(57) ABSTRACT

A fuel cell system of the present invention comprises a fuel cell (13), a load value detecting means (16) configured to detect a load value of a load of electric power or heat which is generated by equipment (14) supplied with the electric power or the heat from the fuel cell system, a load value storage means (17) configured to store a history of the load value which is detected by the load value detecting means (16), a load value predicting means (18) configured to predict a load value which is going to be generated, based on the history of the load value, and to store the predicted load value as load value data, and scheduled start-up time of a fuel cell (13) is decided based on the load value data.

67 Claims, 17 Drawing Sheets

FUEL CELL SYSTEM

CROSS-REFERENCE TO RELATED APPLICATION

This application is a section 371 of International Application No. PCT/JP2004/010992, filed Jul. 26, 2004, which was published in the Japanese language on Feb. 3, 2005, under International Publication No. WO 2005/011034 A1 and the disclosure of which is incorporated herein by reference.

BACKGROUND OF THE INVENTION

The present invention relates to a fuel cell system configured to generate electric power using a fuel cell.

BACKGROUND ART

In some conventional fuel cell systems, an operation is changed according to a power load or a heat load for the purpose of carrying out economical power generation operation. For example, there has been disclosed a fuel cell system in which, when desired electric power is supplied to a power load, a cost necessary to generate the electric power in the fuel cell is compared to a cost necessary to supply the electric power in a power system to determine whether or not the fuel cell supplies the electric power, thus determining whether or not the fuel cell should operate (for example, Japanese Laid-Open Patent Application Publication No. 2002-190308).

FIG. 17 shows the conventional fuel cell system disclosed in Japanese Laid-Open Patent Application Publication No. 2002-190308. A fuel generator 11 in FIG. 17 is configured to generate a fuel gas containing hydrogen through a reforming reaction of a material such as a natural gas in steam-containing atmosphere, and to supply the fuel gas to a fuel cell 13. The fuel cell 13 is configured to generate electric power through an electrochemical reaction using the fuel gas supplied from the fuel generator 11 to the fuel cell 13 and an oxidizing gas such as air supplied from an oxidizing gas supply means 12 to the fuel cell 13. The generated electric power is supplied from a power supply means 15 to a power load 14. A power value detecting means 16 detects electric power consumed in the power load 14. A controller 23 compares a cost necessary when the fuel cell 13 generates and supplies the detected electric power to a cost necessary when the power system supplies the detected electric power, and determines which of the power supply sources is less costly. When the power generation in the fuel cell 13 is less costly, the power supply means 15 supplies the electric power from the fuel cell 13 to the power load 14.

In the fuel cell system, it is necessary to increase temperatures of various components including the fuel cell, up to that at which power generation can start, before the power generation starts, and an energy for increasing the temperatures is necessary. However, in the above described conventional fuel cell system, an energy required for start-up has not been taken into account, and difference between an actual cost and a calculated cost becomes large if the start-up and stop take place frequently.

BRIEF SUMMARY OF THE INVENTION

An object of the present invention is to provide a fuel cell system capable of operating a fuel cell rationally considering an energy associated with start-up of the fuel cell.

In order to achieve the above object, a first invention of the present invention provides a fuel cell system comprising a fuel cell; a load value detecting means configured to detect a load value of a load of electric power or heat which is generated by equipment supplied with the electric power or the heat from the fuel cell system; a load value storage means configured to store a history of the load value detected by the load value detecting means; and a load value predicting means configured to predict a load value which is going to be generated based on the history of the load value and to store the predicted load value as load value data, wherein scheduled start-up time of the fuel cell is decided based on the load value data. Since the fuel cell system can decide the scheduled start-up time by predicting the power load of the equipment supplied with the electric power, it is possible to achieve a fuel cell system in which the fuel cell can be operated advantageously in terms of energy saving, prevention of global warming, and economy. As used herein, the start-up of the fuel cell is meant to include the start-up of devices required to start-up the fuel cell, for example, the fuel generator and the oxidizing gas supply means, as well as the start-up of the fuel cell.

A second invention provides a fuel cell system, wherein the load value is a power value of a power load of the equipment supplied with the electric power from the fuel cell system, and the load value data is power value data.

A third invention provides a fuel cell system, which may further comprise a calculating means configured to calculate an amount of primary energy consumed to supply the electric power, an amount of carbon dioxide generated by supplying the electric power, or a cost necessary to supply the electric power; wherein the calculating means calculate the amount of primary energy, the amount of carbon dioxide, or the cost, based on the power value data for a predetermined time period, for a case where the fuel cell supplies the electric power and for a case where the power system supplies the electric power, and values calculated by the calculating means are compared and start time of the time period is decided as the scheduled start-up time when the value calculated for the case where the power system supplies the electric power is larger than the value calculated for the case where the fuel cell supplies the electric power.

Fourth and sixteenth inventions provide a fuel cell system, wherein the calculating means calculates the amount of the primary energy consumed to supply the electric power or the electric power and the heat from the fuel cell, the amount of carbon dioxide generated by supplying the electric power or the electric power and the heat from the fuel cell, or the cost necessary to supply the electric power or the electric power and the heat from the fuel cell, considering an amount of a primary energy consumed to start-up the fuel cell, an amount of carbon dioxide generated at the start-up of the fuel cell, or a cost necessary to start-up the fuel cell. Fifth and seventeenth inventions provide a fuel cell system wherein the calculating means calculates the amount of the primary energy consumed to start-up the fuel cell, the amount of carbon dioxide generated at the start-up of the fuel cell, or the cost necessary to start-up the fuel cell, based on a temperature of the fuel cell. Since the fuel cell system can predict the primary energy or the like consumed from the start-up of the fuel cell to the start of power generation, it can make determination as to operation more appropriately.

Sixth and eighteenth inventions provide a fuel cell system, which may further comprise a fuel generator configured to generate a fuel containing hydrogen from a material, wherein the calculating means calculates the amount of the primary energy consumed to supply the electric power or the electric power and the heat from the fuel cell, the amount of carbon dioxide generated by supplying the electric power or the electric power and the heat from the fuel cell, or the cost necessary to supply the electric power or the electric power and the heat from the fuel cell, considering an amount of a primary energy consumed to start-up the fuel cell, an amount of carbon dioxide generated at the start-up of the fuel cell, or a cost necessary to start-up the fuel cell. Seventh and nineteenth inventions provide a fuel cell system, wherein the calculating means calculates the amount of the primary energy consumed to start-up the fuel cell, the amount of carbon dioxide generated at the start-up of the fuel cell, or the cost necessary to start-up the fuel cell, based on a temperature of the fuel generator. Since the fuel cell system can predict the primary energy or the like consumed from the start-up to the start of the power generation of the fuel cell, including warm-up of the fuel generator, it can make determination as to the operation more appropriately.

Eighth and twentieth inventions provide a fuel cell system, which may further comprise an input means by which the value to be calculated by the calculating means is selected from the primary energy, the carbon dioxide, or the cost. Thereby, since the operation of the fuel cell system can be switched according to the user's preference, it is possible to raise the user's concerns about energy saving, prevention of global warming and economy.

Ninth and twenty first inventions provide a fuel cell system, which may further comprise a display means: wherein a difference in the amount of primary energy, the amount of carbon dioxide or the cost is calculated using the calculated values of the calculating means, for a case where the fuel cell supplies the electric power or the electric power and the heat and for the case where the power system supplies the electric power or the power system and an external heat supply means supplies the electric power and the heat, respectively, and the display means displays the difference. Thereby, since the user can recognize the energy saving, the prevention of global warming or the economy by specific numeric values, it is possible to raise the user's concerns about the energy saving, the prevention of global warming and economy.

A tenth invention provides a fuel cell system, which may further comprise a heat storage means configured to recover waste heat from the fuel cell and to store the heat; and a heat supply means configured to supply the heat stored in the heat storage means to outside, wherein the calculating means further calculates an amount of heat recovered by the heat storage means, and an amount of the primary energy consumed to supply the heat from an external heat supply means, an amount of carbon dioxide generated by supplying the heat from the external heat means, or the cost necessary to supply the heat from the external heat means, based on the power value data for the time period, thereby calculating an amount of primary energy, an amount of carbon dioxide or a cost for a case where the fuel cell supplies the electric power and the heat and for a case where the power system supplies the electric power and the external heat supply means supplies the heat, and wherein values calculated by the calculating means are compared and start time of the time period is decided as the scheduled start-up time when the value calculated for the case where the power system and the external heat supply means supply the electric power and the heat, respectively, are larger than the value calculated for the case where the fuel cell supplies the electric power and the heat. Thereby, in the fuel cell system configured to supply the electric power and heat, the operation of the fuel cell, including the start-up to the stop of the fuel cell, can be carried out advantageously in terms of energy saving, prevention of global warming and economy.

An eleventh invention provides a fuel cell system, wherein the scheduled start-up time is updated for each predetermined update time. Thereby, since it is determined whether or not to operate the fuel cell on a regular basis, the fuel cell system can make determination as to the operation more appropriately.

A twelfth invention provides a fuel cell system, which may further comprise a display means configured to display the scheduled start-up time. Thereby, since the user can know the start-up and stop of the fuel cell, it is possible to raise the user's concerns about the energy saving, the prevention of global warming and economy.

A thirteenth invention provides a fuel cell system, wherein the display means is configured to display a history of past operation. Thereby, since the user can know the start-up and stop of the fuel cell, it is possible to raise the user's concerns about the energy saving, the prevention of global warming and economy.

A fourteenth invention provides a fuel cell system, which may further comprise a heat storage means configured to recover waste heat from the fuel cell and to store the heat; a heat supply means configured to supply the heat stored in the heat storage means to outside; and a stored heat amount detecting means configured to detect an amount of the heat stored in the heat storage means, wherein the load value is a calorie value of a heat load of the equipment supplied with the heat from the fuel cell system. Thereby, when the fuel cell system configured to supply the heat and electric power operates the fuel cell in response to the heat load, the operation of the fuel cell, including the start-up to stop of the fuel cell, can be operated advantageously in terms of energy saving, prevention of global warming and economy.

A fifteenth invention provides a fuel cell system, which may further comprise: a calculating means configured to calculate an amount of primary energy consumed to supply the heat and the electric power, an amount of carbon dioxide generated by supplying the electric power and the heat, or a cost necessary to supply the electric power and the heat, wherein the calculating means calculates the amount of primary energy, the amount of carbon dioxide or the cost based on the calorie value data for a predetermined time period for a case where the fuel cell supplies the electric power and the heat and for a case where the power system and the external heat supply means supply the electric power and the heat, respectively, and wherein values calculated by the calculating means are compared and start time of the time period is decided as the scheduled start-up time when the value calculated for the case where the power system and the external heat supply means supply the electric power and the heat, respectively, is larger than the value calculated for the case where the fuel cell supplies the electric power and the heat.

A twenty second invention provides a fuel cell system, which may further comprise: a heat storage means configured to recover waste heat from the fuel cell and to store the heat; a heat supply means configured to supply the heat stored in the heat storage means to outside; a stored heat amount detecting means configured to detect an amount of the heat stored in the heat storage means; and a selecting means configured to select the load value from a calorie value of a heat load of the equipment supplied with the heat from the fuel cell system or a power value of a power load of the equipment supplied with the electric power from the fuel cell system, and to thereby select power value data or calorie value data as the load value data. Thereby, heat load responsive operation or power load responsive operation can be selected according to use conditions of the fuel cell system.

A twenty third invention provides a fuel cell system, wherein the load value storage means stores the load value such that the load value in a case where a user is at home and the load value in a case where the user is away from home are distinguished from each other, and wherein the selecting means selects determination of the scheduled start-up time of the fuel cell from determination based on the power value data in the case where the user is at home, determination based on the power value data in the case where the user is away from home, determination based on the calorie value data in the case where the user is at home, and determination based on the calorie value data in the case where the user is away from home. This makes it possible to predict the power value and the calorie value more appropriately.

A twenty fourth invention provides a fuel cell system, which may further comprise: an operation time setting means capable of, as desired, setting the scheduled start-up time of the fuel cell. Since the start-up of the fuel cell can be set considering the planned activity of the user, the fuel cell system can be operated more appropriately.

The above and further objects and features of the invention will be more fully be apparent from the following detailed description with accompanying drawings.

BRIEF DESCRIPTION OF THE SEVERAL VIEW OF

DETAILED DESCRIPTION OF THE

Hereinafter, embodiments of the present invention will be described with reference to the drawings.

Embodiment 1

Figure 1:
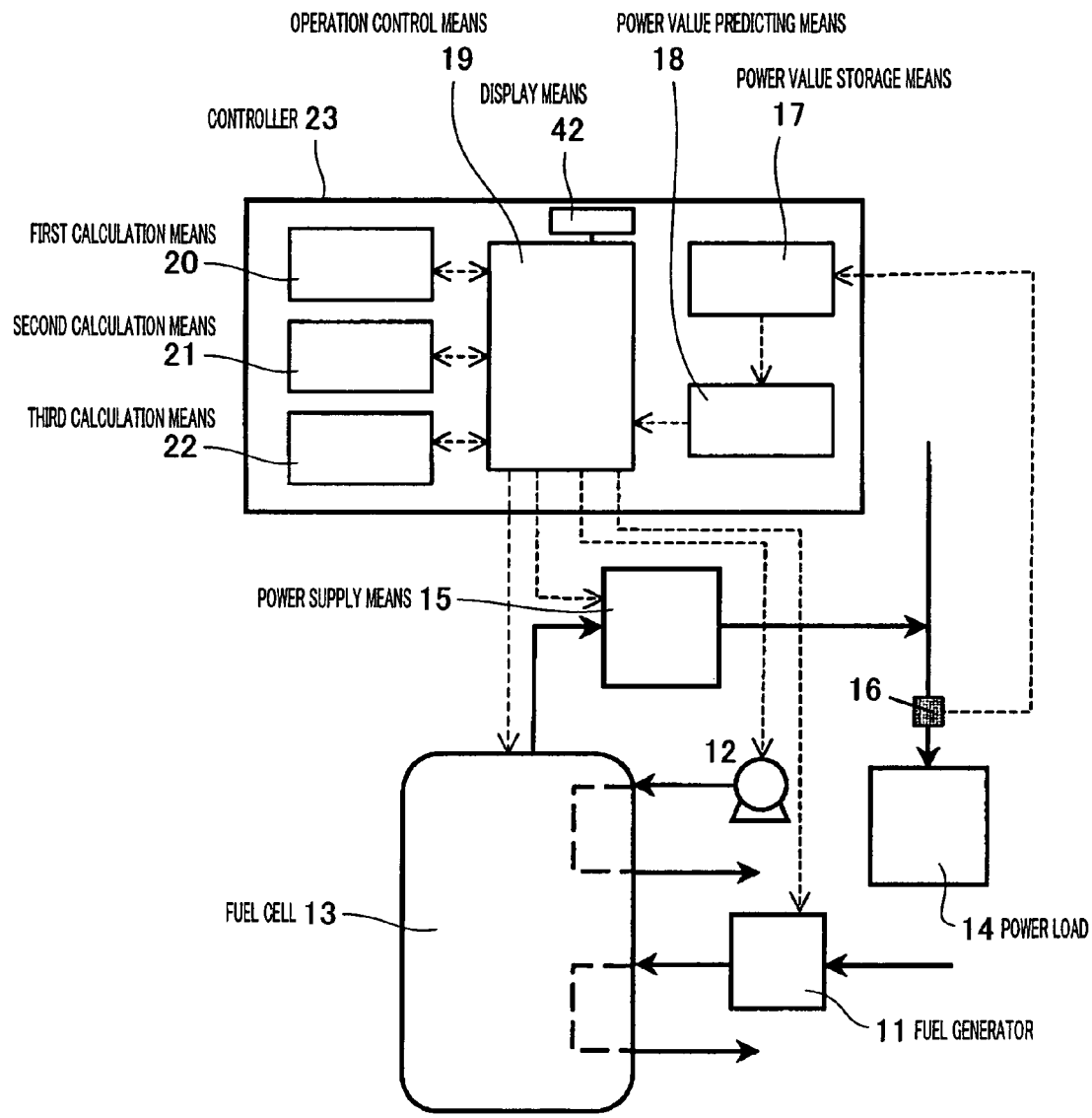
FIG. 1 is a view of a construction of a fuel cell system according to a first embodiment of the present invention.

FIG. 1 is a view of a construction of a fuel cell system according to a first embodiment of the present invention. The fuel cell system of this embodiment comprises a fuel generator 11 configured to generate a fuel gas containing hydrogen from a material such as a natural gas, an oxidizing gas supply means 12 configured to supply an oxidizing gas, a fuel cell 13 configured to generate electric power and heat through an electrochemical reaction using the fuel gas supplied from the fuel generator 11 and the oxidizing gas such as air supplied from the oxidizing gas supply means 12, a power supply means 15 configured to supply the electric power generated in the fuel cell 13 to a power load 14 such as an air conditioning equipment or a refrigerator, a power value detecting means 16 configured to detect an electric power consumed in the power load 14, and a controller 23 configured to control an operation of the fuel cell system.

The power supply means 15 includes an inverter, a switch, etc.

The controller 23 includes a power value storage means 17 configured to store a value detected by the power value detecting means 16, a power value predicting means 18 configured to predict a power value $W_t$ (power value $W_t$ after t minutes) of an electric power consumed in the power load 14 from a history of stored power values, and to store power value data including the power value $W_t$, an operation control means 19, and a display means 42. Herein, the start-up of the fuel cell 13 is meant to include start-up of various components necessary for the start-up of the fuel cell 13, for example, the fuel generator 11 and the oxidizing gas supply means 12, as well as the start-up of the fuel cell 13.

The operation control means 19 determines scheduled start-up time $T_1$, scheduled power generation start time $T_2$, and scheduled stop time $T_3$ of the fuel cell 13 based on the power value data stored in the power value predicting means 18, and causes the fuel cell 13 to perform start-up, and start and stop of power generation based on these times $T_1$, $T_2$, and $T_3$.

The controller 23 includes calculating means 20, 21, and 22 configured to perform calculation based on the power value data and to output calculation values to the operation control means 19. The first calculating means 20 calculates the amount of primary energy consumed when the fuel cell 13 generates and supplies an electric power corresponding to a power value of power value data for a predetermined time period. The second calculating means 21 calculates the amount of primary energy consumed when the power system supplies the electric power corresponding to the power value of the power value data for the predetermined time period. The third calculating means 22 calculates the amount of primary energy consumed when the fuel cell system including the fuel cell 13, the fuel generator 11, etc., starts-up.

The operation control means 19 is equipped with a timer (not shown), which allows the operation control means 19 to update the scheduled start-up time $T_1$, the scheduled power generation start time $T_2$, and the scheduled stop time $T_3$ at each predetermined updated time. Thereby, it is determined whether or not the operation is appropriate on a regular basis. As a result, the fuel cell system can be operated more appropriately.

The display means 42 displays the scheduled start-up time $T_1$, the scheduled power generation start time $T_2$, and the scheduled stop time $T_3$ which are set in the operation control means 19. In addition, the display means 42 displays a history of power values resulting from generation in the fuel cell system between the scheduled power generation start time $T_2$, and the scheduled stop time $T_3$ in the past, from the history of the power values stored in the power value storage means 17. The operation control means 19 calculates difference between values to be compared in step S14A, S14B or S14C to be described later, and the display means 42 displays the difference values. This makes it possible to raise up users' concern about energy resources, environmental burden or economy.

The controller 23 contains, for example, a microcomputer. A CPU executes predetermined programs (hereinafter referred to as time determination programs) stored in an internal memory of the microcomputer to cause the means 17 through 22 included in the controller 23 to be implemented. The required data in the execution of the time determination programs are stored in, for example, the internal memory of the microcomputer.

Figure 2:
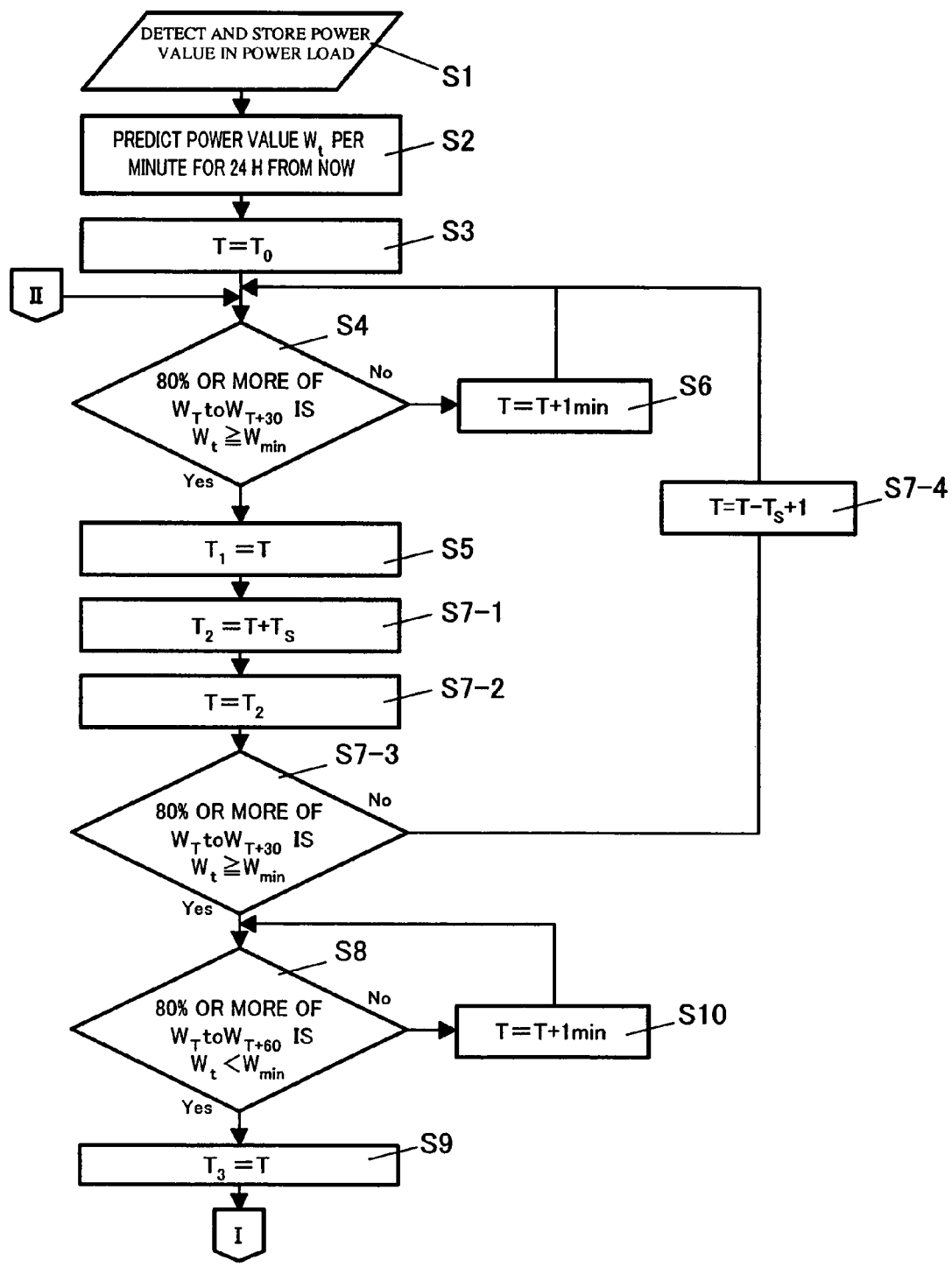
FIG. 2 is a flowchart showing a former half of a flow of a control of a fuel cell system according to the first embodiment of the present invention.
Figure 3:
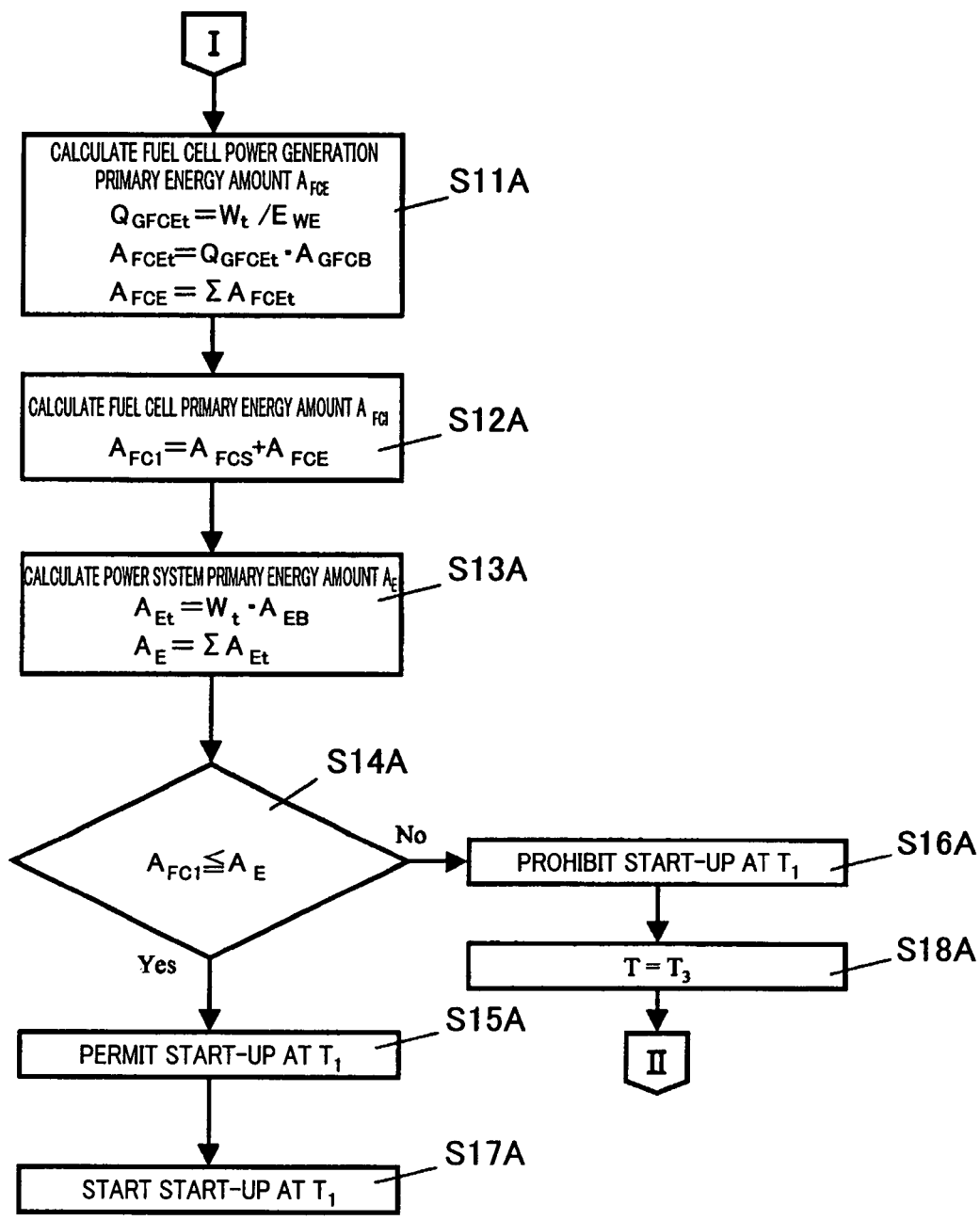
FIG. 3 is a flowchart showing a latter half of the flow of the control of the fuel cell system according to the first embodiment of the present invention.

An operation performed before and at the start-up of the fuel cell 13 in the embodiment constructed above will be described. FIGS. 2 and 3 are flowcharts showing a flow of a control in the fuel cell system, i.e., a content of the time determination program.

As shown in FIG. 2, in step S1, the power value detecting means 16 continuously detects a power value and the power value storage means 17 stores the detected power value. Herein, the power value detecting means 16 detects the power value in each one second.

In step S2, the power value predicting means 18 predicts a power value $W_t$ per minute that is assumed to be consumed in the power load 14 for 24 hours from now, based on the history of the power values stored in the power value storage means 17 and stores the power value $W_t$ as power value data.

Subsequently, the operation control means 19 selects a time period in which power values higher than a predetermined value, for example, a minimum power generation amount $W_{min}$ of the fuel cell 13 distribute in large part, based on the power value data stored in the power value predicting means 18.

Herein, in step S3, the operation control means 19 assigns current time $T_0$ to time T.

In step S4, the operation control means 19 determines whether or not $Y_1$% or higher of power values $W_t$ (30 values of $W_T$ to $W_{T+30}$) (for example, 80% or more, 24 or more) for predetermined time $X_1$ (for example, 30 minutes) after T are not less than the minimum power generation amount $W_{min}$ of the fuel cell system. When Yes, the operation control 19 assumes T as the scheduled start-up time $T_1$ in step S5. When No, the operation control means 19 assumes time one minute after T as T (T=T+1 min), and returns the process to step S4.

In step S7—1, the operation control means 19 adds start-up time $T_s$ (for example 60 minutes) to the T and assumes it as scheduled power generation start time $T_2$.

In step S7—2, the operation control means 19 assigns the scheduled power generation start time $T_2$ to the T.

In step S7—3, the operation control means 19 determines whether or not $Y_1$% or higher of power values $W_t$ (30 values of $W_T$ to $W_{T+30}$) (for example, 80% or more, 24 or more) for the predetermined time $X_1$ (for example, 30 minutes) after the T are not less than the minimum power generation amount $W_{min}$ of the fuel cell system. When Yes, the operation control means 19 advances the process to step S8. When No, the operation control means 19 assumes time (start-up time $T_s$—one minute) before the T as the T and returns the process to step S4.

In step S8, the operation control means 19 determines whether or not $Y_2$% or higher of power values $W_t$ (60 values of $W_T$ to $W_{T+60}$) (for example, 80% or more, 48 or more) for predetermined time $X_2$ (for example, 60 minutes) after T are less than the minimum power generation amount $W_{min}$ of the fuel cell system. When Yes, the operation control means 19 assumes the T as the scheduled stop time $T_3$ in step S9. When No, the operation control means 19 assumes time one minute after the T as the T in step S10, and returns the process to step S8.

After assuming the scheduled start-up time $T_1$, the scheduled power generation start time $T_2$, and the scheduled stop time $T_3$ of the fuel cell 13 in the manner described above, the operation control means 19 advances the process to step after I in FIG. 3 which follows I in FIG. 2, and determines the scheduled start-up time $T_1$, the scheduled power generation start time $T_2$, and the scheduled stop time $T_3$ of the fuel cell 13, considering the amount of primary energy consumed.

In step S11A, the first calculating means 20 calculates a feed gas amount $Q_{GFCEt}$ required for power generation of the power value $W_t$ per minute of the power value data for a time period from the scheduled power generation time $T_2$ to the scheduled stop time $T_3$ in a case where the fuel cell 13 generates and supplies electric power, based on power generation efficiency $E_{WE}$ of the fuel cell system including the fuel cell 13, the fuel generator 11, etc, according to a formula (1). And, the first calculating means 20 calculates primary energy amount $A_{FCEt}$ of primary energy consumed in a case where the fuel cell system generates and supplies electric power for the time period from the scheduled power generation start-up time $T_2$ to the scheduled stop time $T_3$ based on primary energy amount $A_{GFCB}$ per unit feed gas according to a formula (2A), and integrates values of $A_{FCEt}$ from $T_2$ to $T_3$ to obtain power generation primary energy amount $A_{FCE}$.

$$Q_{GFCEt}=W_t/E_{WE} \qquad (1)$$

$$A_{FCEt}=Q_{GFCEt} \cdot A_{GFCB} \qquad (2A)$$

In step S12A, the third calculating means 22 calculates the amount of primary energy consumed at the start-up of the fuel cell system to obtain a fuel cell start-up primary energy amount $A_{FCS}$. The operation control means 19 adds the fuel cell power generation primary energy amount $A_{FCE}$ output from the first calculating means 20 to the fuel cell start-up primary energy amount $A_{FCS}$ output from the third calculating means 22 to obtain first fuel cell primary energy amount $A_{FC1}$.

In step S13A, the second calculating means 21 calculates primary energy amount $A_{Et}$ of primary energy consumed in a case where the power system supplies electric power corresponding to power value $W_t$ per minute of the power value data for the time period from the scheduled power generation start-up time $T_2$ to the scheduled stop time $T_3$ based on the primary energy amount $A_{EB}$ per unit power of the power system according to a formula (3A), and integrates $A_{Et}$ from $T_2$ to $T_3$ to obtain a power system primary energy amount $A_E$.

$$A_{Et}=W_t \cdot A_{EB} \qquad (3A)$$

In step S14A, the operation control means 19 compares the first fuel cell primary energy amount $A_{FC1}$ to the power system primary energy amount $A_E$. When the first fuel cell primary energy amount $A_{FC1}$ is not more than the power system primary energy amount $A_E$, the operation control means 19 advances the process to step S15A, in which the operation control means 19 decides the scheduled start-up time $T_1$, the scheduled power generation start time $T_2$ and the scheduled stop time $T_3$. In step S17A, the operation control means 19 starts-up the fuel cell system at the scheduled start-up time $T_1$. On the other hand, when the first fuel cell primary energy amount $A_{FC1}$ is more than the power system primary energy amount $A_E$, the operation control means 19 advances the process to step S16A, in which the operation control means 19 cancels assumption of the scheduled start-up time $T_1$, the scheduled power generation start time $T_2$ and the scheduled stop time $T_3$, i.e., prohibits the start-up of the fuel cell 13 at the scheduled start-up time $T_1$. In step S18A, the operation control means 19 assigns the scheduled stop time $T_3$ to the time T. The operation control means 19 returns the process to step S4 from II in FIG. 2 which follows II in FIG. 3, and repeats the following steps.

As described above, the primary energy amount of the primary energy consumed in the fuel cell system including the primary energy amount of the primary energy consumed during the start-up of the fuel cell is compared to the primary energy amount of the primary energy consumed in the power system to determine whether the fuel cell system should operate or stop. Thereby, in an operation state in which the fuel cell system frequently repeats start-up and stop, the fuel cell system can be operated while inhibiting wasteful energy consumption.

Embodiment 2

Figure 4:
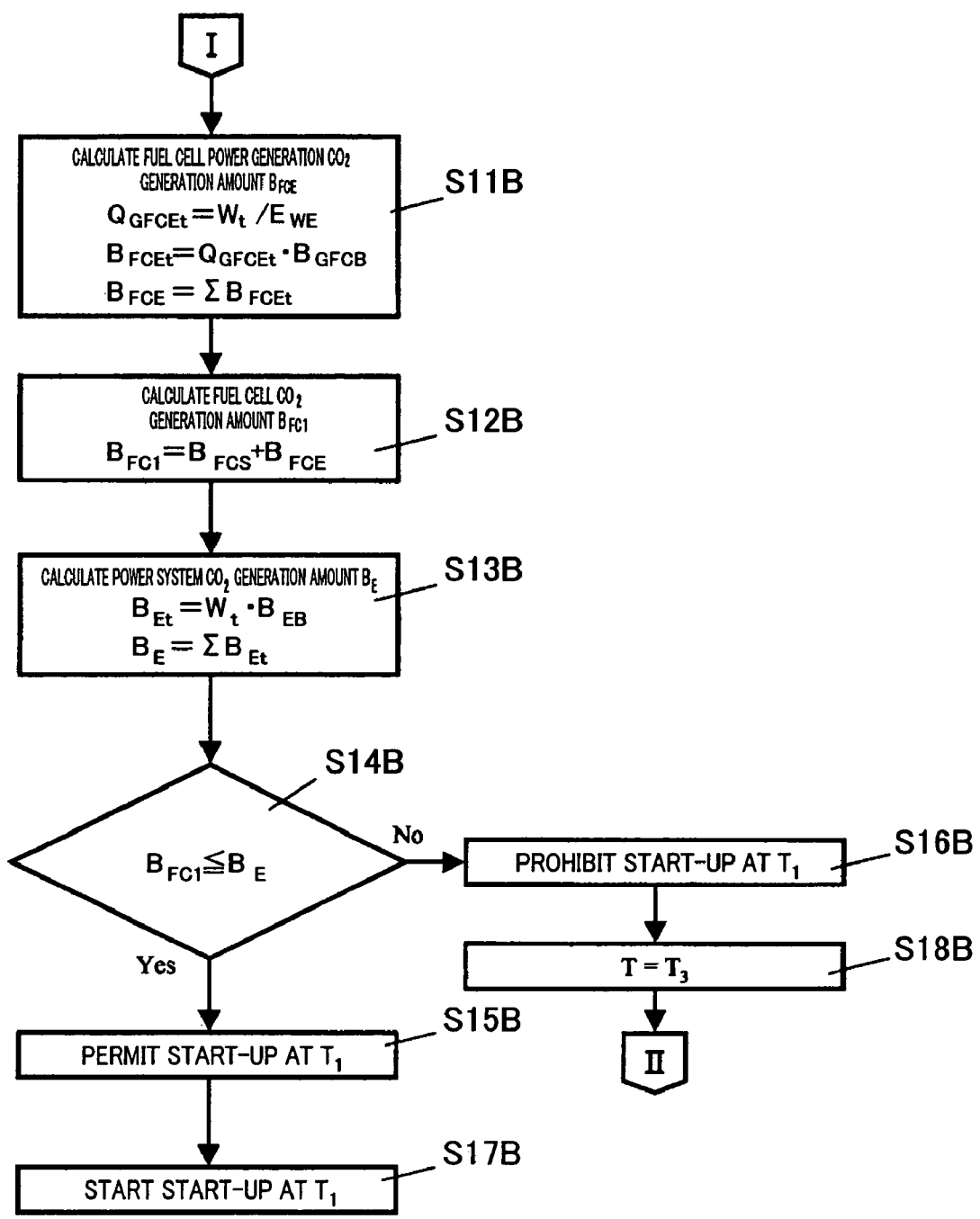
FIG. 4 is a flowchart showing a latter half of a flow of a control of a fuel cell system according to a second embodiment of the present invention.

FIG. 4 is a flowchart showing a latter half of a flow of a control of a fuel cell system according to a second embodiment of the present invention. In a second embodiment, the operation control means 19 of the fuel cell system of the first embodiment compares amounts of carbon dioxide (hereinafter referred to as $CO_2$) and decides the scheduled start-up time $T_1$, the scheduled power generation start time $T_2$, and the scheduled stop time $T_3$. Specifically, the first calculating means 20 calculates the amount of $CO_2$ generated when the fuel cell 13 generates and supplies electric power corresponding to a power value of power value data for a predetermined time period. The second calculating means 21 calculates the amount of $CO_2$ generated when the power system generates and supplies the electric power corresponding to the power value of the power value data for the predetermined time period. The third calculating means 22 calculates the amount of $CO_2$ generated when the fuel cell system, including the fuel cell 13, the fuel generator 11, etc, starts-up.

Since a construction of the fuel cell system according to the second embodiment and a flowchart showing a former half of the flow of the control of the fuel cell system are identical to those of FIGS. 1 and 2 of the first embodiment, they will not be further described.

Hereinafter, the latter half of the flow of the control of the fuel cell system will be described.

As shown in FIG. 4, in step S11B, the first calculating means 20 calculates a feed gas amount $Q_{GFCEt}$ required for power generation of the power value $W_t$ per minute of the power value data for the time period from the scheduled power generation start time $T_2$ to the scheduled stop time $T_3$ based on the power generation efficiency $E_{WE}$ of the fuel cell system according to the formula (1). In addition, the first calculating means 20 calculates the amount $B_{FCEt}$ of $CO_2$ generated when the fuel cell system generates and supplies the electric power for the time period from the scheduled power generation start time $T_2$ to the scheduled stop time $T_3$ based on the amount $B_{GFCB}$ of $CO_2$ per unit feed gas according to a formula (2B), and integrates $B_{FCEt}$ from $T_2$ to $T_3$ to obtain fuel cell power generation $CO_2$ amount $B_{FCE}$.

$$B_{FCEt}=Q_{GFCEt}\cdot B_{GFCB} \quad (2B)$$

In step S12B, the third calculating means 22 calculates the amount of $CO_2$ generated when the fuel cell system starts-up to obtain fuel cell start-up $CO_2$ generation amount $B_{FCS}$. Then, the operation control means 19 adds the fuel cell power generation $CO_2$ generation amount $B_{FCE}$ output from the first calculating means 20 to the fuel cell start-up $CO_2$ generation amount $B_{FCS}$ output from the third calculating means 22 to obtain first fuel cell $CO_2$ generation amount $B_{FC1}$.

In step S13B, the second calculating means 21 calculates the amount $B_{Et}$ of $CO_2$ generated when the power system supplies the electric power corresponding to the power value $W_t$ per minute of the power value data for the time period from the scheduled power generation start time $T_2$ to the scheduled stop time $T_3$ based on the $CO_2$ generation amount $B_{EB}$ per unit power of the power system according to a formula (3B), and integrates $B_{Et}$ from $T_2$ to $T_3$ to obtain power system $CO_2$ generation amount $B_E$.

$$B_{Et}=Wt\cdot B_{EB} \quad (3B)$$

In step S14B, the operation control means 19 compares the first fuel cell $CO_2$ generation amount $B_{FC1}$ to the power system $CO_2$ generation amount $B_E$. When the first fuel cell $CO_2$ generation amount $B_{FC1}$ is not more than the power system $CO_2$ generation amount $B_E$, the operation control means 19 advances the process to step S15B, in which the operation control means 19 decides the scheduled start-up time $T_1$, the scheduled power generation start time $T_2$, and the scheduled stop time $T_3$. In step S17B, the operation control means 19 starts-up the fuel cell system at the scheduled start-up time $T_1$. On the other hand, when the first fuel cell $CO_2$ generation amount $B_{FC1}$ is more than the power system $CO_2$ generation amount $B_E$, the operation control means 19 advances the process to step S16B, in which the operation control means 19 cancels assumption of the scheduled start-up time $T_1$, the scheduled power generation start time $T_2$, and the scheduled stop time $T_3$, i.e., prohibits the start-up of the fuel cell at the scheduled start-up time $T_1$. In step S18B, the operation control means 19 assigns the scheduled stop time $T_3$ to the time T and returns the process to step S4 from II in FIG. 2 which follows II in FIG. 3, to repeat the following steps.

As described above, the amount of $CO_2$ generated in the fuel cell system including the amount of $CO_2$ generated during the start-up of the fuel cell 13 is compared to the amount of $CO_2$ generated in the power system to determine whether the fuel cell system should operate or stop. Thereby, in the operation state in which the fuel cell system frequently repeats the start-up and the stop, the fuel cell system can be operated while inhibiting generation of $CO_2$ and hence preventing global warming.

Embodiment 3

Figure 5:
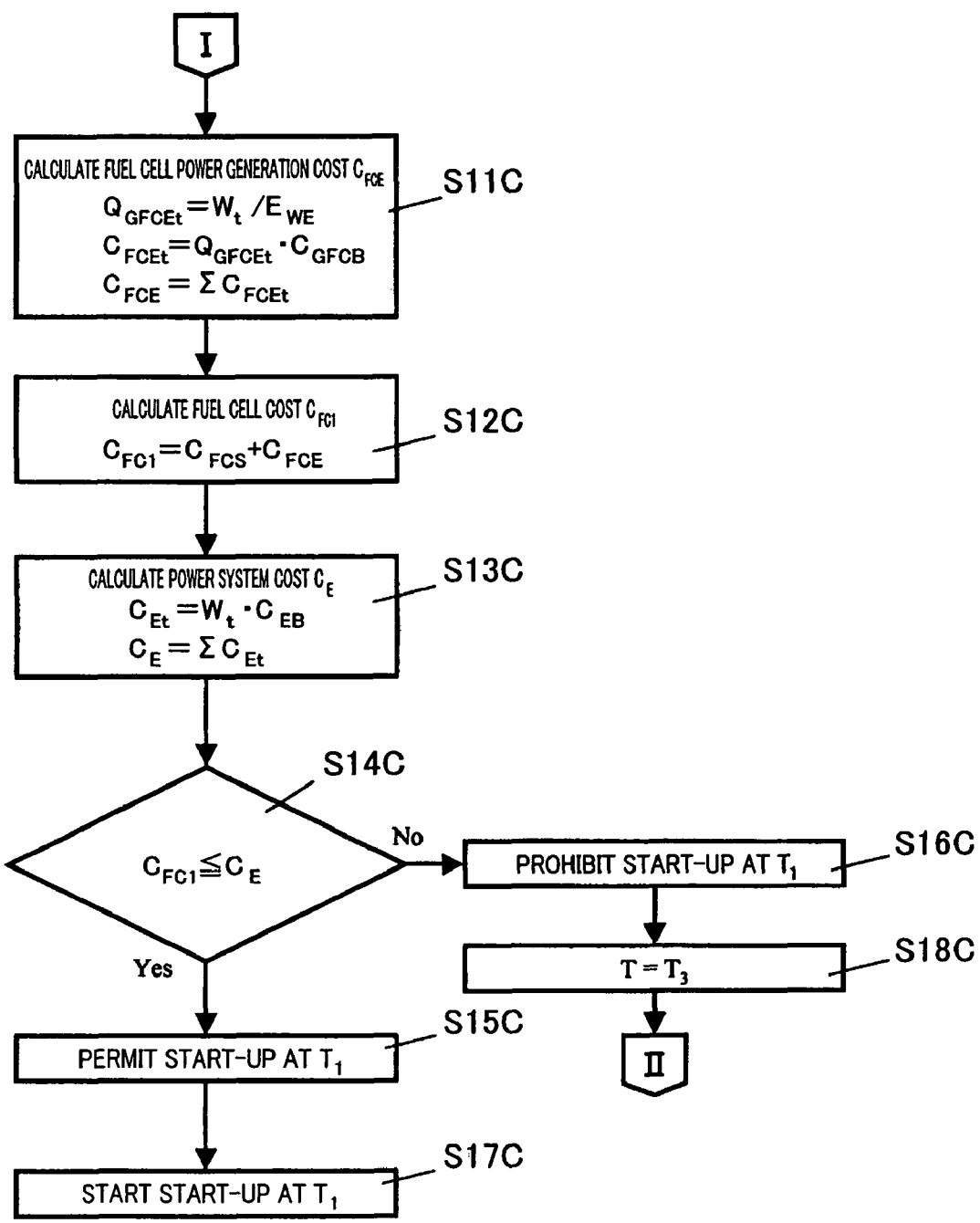
FIG. 5 is a flowchart showing a latter half of a flow of a control of a fuel cell system according to a third embodiment of the present invention.

FIG. 5 is a flowchart showing a latter half of a flow of a control of a fuel cell system according to a third embodiment of the present invention. In the third embodiment, the operation control means 19 in the fuel cell system of the first embodiment compares costs to decide the scheduled start-up time $T_1$, the scheduled power generation start time $T_2$, and the scheduled stop time $T_3$. Specifically, the first calculating means 20 calculates a cost necessary when the fuel cell 13 generates and supplies electric power corresponding to a power value of power value data for a predetermined time period. The second calculating means 21 calculates a cost necessary when the power system supplies electric power corresponding to the power value of the power value data for the predetermined time period. The third calculating means 22 calculates a cost necessary to start-up the fuel cell system including the fuel cell 13, the fuel generator 11, etc.

Since a construction of the fuel cell system according to the third embodiment and a flowchart showing a former half of the flow of the control of the fuel cell system are identical to those of FIGS. 1 and 2 of the first embodiment, they will not be further described.

Hereinbelow, the latter half of the control of the fuel cell system will be described.

As shown in FIG. 5, in step S1C, the first calculating means 20 calculates feed gas amount $Q_{GFCEt}$ required for power generation of the power value $W_t$ per minute of power value data for the time period from the scheduled power generation start time $T_2$ to the scheduled stop time $T_3$ when the fuel cell 13 generates and supplies the electric power based on the power generation efficiency EWE of the fuel cell system according to the formula (1). In addition, the first calculating means 20 calculates a cost $C_{FCEt}$ necessary when the fuel cell system generates and supplies electric power for the time period from the scheduled power generation start time $T_2$ to the scheduled stop time $T_3$ based on metered fare $C_{GFCB}$ of the feed gas according to a formula (2C), and integrates $C_{FCEt}$ from the $T_2$ to $T_3$ to obtain fuel cell power generation cost $C_{FCE}$.

$$C_{FCEt} = Q_{GFCEt} \cdot C_{GFCB} \tag{2C}$$

In step S12C, the third calculating means 22 calculates a cost necessary to start-up the fuel cell system to obtain fuel cell start-up cost $C_{FCS}$. In addition, the operation control means 19 adds the fuel cell power generation cost $C_{FCE}$ output from the first calculating means 20 to the fuel cell start-up cost $C_{FCS}$ to obtain first fuel cell cost $C_{FC1}$.

In step S13C, the second calculating means 21 calculates cost $C_{Et}$ necessary when the power system supplies the electric power corresponding to the power value $W_t$ per minute of power value data for a time period from the scheduled power generation start time $T_2$ to the scheduled stop time $T_3$ based on metered fare $C_{EB}$ of the power system according to a formula (3C) and integrates $C_{Et}$ from $T_2$ to $T_3$ to obtain power system cost $C_E$.

$$C_{Et} = W_t \cdot C_{EB} \tag{3C}$$

In step S14C, the operation control means 19 compares the first fuel cell cost $C_{FC1}$ to the power system cost $C_E$. When the first fuel cell cost $C_{FC1}$ is not more than the power system cost $C_E$, the operation control means 19 advances the process to step S15C, in which the operation control means 19 decides the scheduled start-up time $T_1$, the scheduled power generation start time $T_2$, and the scheduled stop time $T_3$. In step S17C, the operation control means 19 starts-up the fuel cell system at the scheduled start-up time $T_1$. On the other hand, when the first fuel cell cost $C_{FC1}$ is more than the power system cost $C_E$, the operation control means 19 advances the process to step S16C, in which the operation control means 19 cancels assumption of the scheduled start-up time $T_1$, the scheduled power generation start time $T_2$, and the scheduled stop time $T_3$, i.e., prohibits the start-up of the fuel cell 13 at the scheduled start-up time $T_1$. In step S18C, the operation control means 19 assigns the scheduled stop time $T_3$ to the time T.

The operation control means 19 returns the process to step S4 from II in FIG. 2 which follows II in FIG. 3 and repeats the following steps.

In the manner described above, the cost of the fuel cell system considering the cost at the start-up of the fuel cell is compared to the power system cost to determine whether the fuel cell system should operate or stop. Thereby, in an operation state in which the fuel cell system frequently repeats start-up and stop, the fuel cell system can be operated economically.

The controller 23 may include an input means (not shown) such as a switch, a key board, a mouse or the like, the first to third calculating meanss 20 to 22, the operation control means 19, and the display means 42 of the first to third embodiments, and may be configured to select any of the first to third embodiments by the input means. In this manner, it is possible to switch the operation of the fuel cell system according to the user's preference.

Embodiment 4

Figure 6:
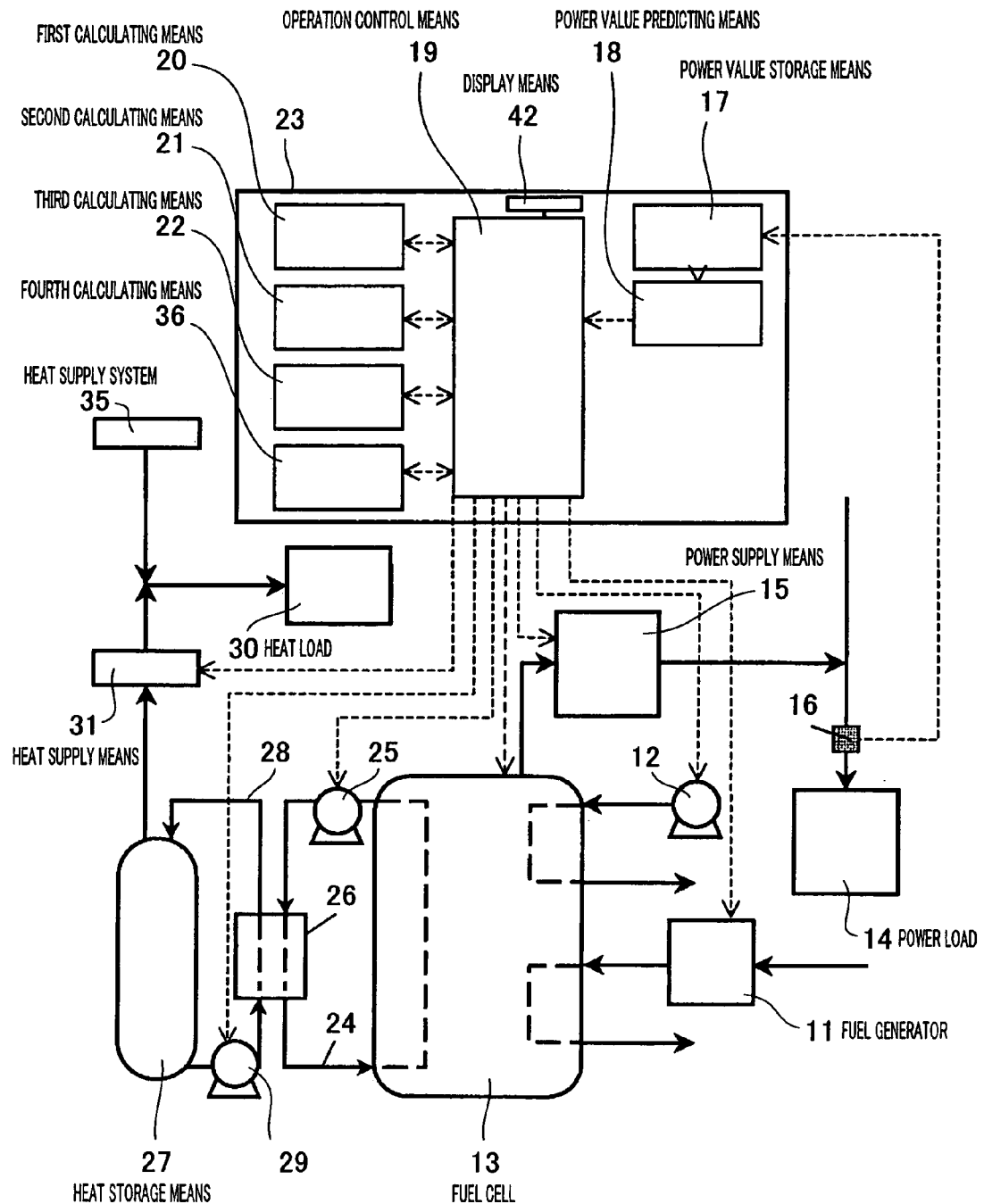
FIG. 6 is a view of a construction of a fuel cell system according to a fourth embodiment of the present invention.

FIG. 6 is a view showing a construction of a fuel cell system according to a fourth embodiment of the present invention. In FIG. 6, the same reference numerals as those of the first embodiment denote the same components, which will not be described.

The fuel cell system of this embodiment comprises, in addition to the construction of the fuel cell system in FIG. 1, a cooling water passage 24 through which cooling water for keeping the fuel cell 13 at a predetermined temperature flows, a cooling water pump 25 configured to cause the cooling water to flow through the cooling water passage 24, a heat storage means 27, a heat exchanger 26 configured to allow the cooling water to transfer heat recovered from the fuel cell 13 to stored hot water, a stored hot water passage 28 configured to allow the stored hot water to recover heat from the fuel cell 13 and to store it in the heat storage means 27 as the hot water, a stored hot water pump 29 configured to allow the stored hot water to flow through the stored hot water passage 28, and a heat supply means 31 configured to supply heat from the heat storage means 27 to the heat load 30 for hot water supply or air conditioning.

The controller 23 further includes a fourth calculating means 36 configured to perform calculation based on power value data and to give calculated data to the operation control means 19.

The fourth calculating means 36 calculates the amount of primary energy consumed when a heat supply system 35 supplies heating calories corresponding to heating calories of the heat recovered in the fuel cell system according to the power value of power value data for the predetermined period. As used herein, the heat supply system 35 includes an external heat supply means such as a steam line or a gas heater.

Figure 7:
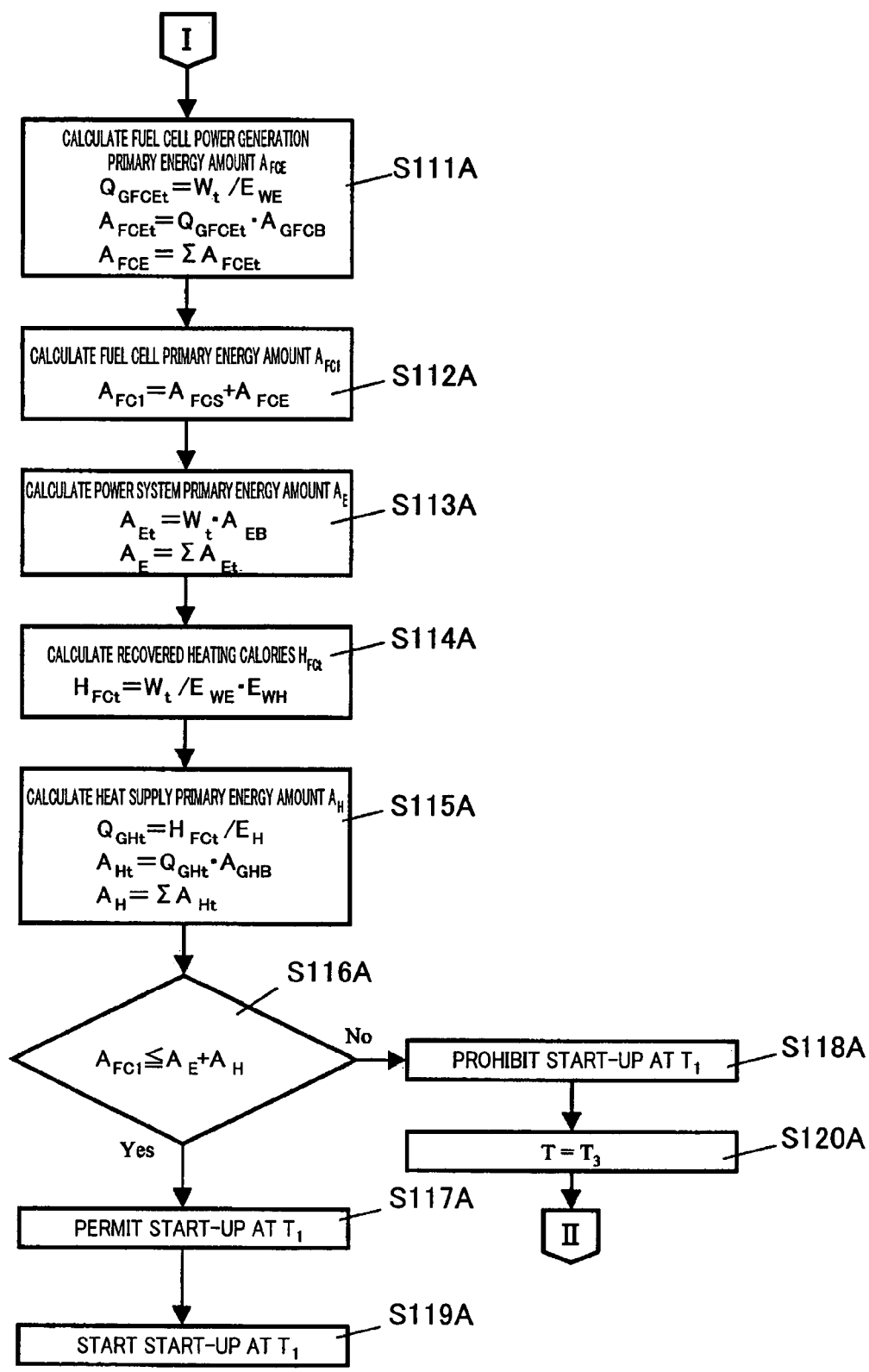
FIG. 7 is a flowchart showing a latter half of a flow of a control of the fuel cell system according to the fourth embodiment of the present invention.

An operation performed before and at the start-up of the fuel cell 13 in the fourth embodiment constructed as described above will be described. FIG. 7 is a flowchart showing a latter half of a flow of a control of the fuel cell system. Since the operation before step S111A of the operation of the fuel cell system in the fourth embodiment is identical to the flowchart of the flow of the control of the fuel cell system in the steps including the step S10 in FIG. 2 of the first embodiment, it will not be described.

Hereinbelow, the latter half of the flow of the control of the fuel cell system will be described.

After assuming the scheduled start-up time $T_1$, the scheduled power generation start time $T_2$, and the scheduled stop time $T_3$ of the fuel cell 13 in the steps including the step S10 in FIG. 2, the operation control means 19 advances the step after I in FIG. 7 which follows I in FIG. 2, and decides the scheduled start-up time $T_1$, the scheduled power generation start time $T_2$, and the scheduled stop time $T_3$ considering the amount of the primary energy consumed.

The steps S111A to S113A are identical to the steps S11A to S13A in FIG. 3 of the first embodiment, and therefore, will not be described.

In step S114A, the fourth calculating means 36 calculates recovered heating calories $H_{FCt}$ of the heat recovered in association with power generation when the fuel cell system generates and supplies electric power corresponding to power value $W_t$ per minute of power value data for the time period from the scheduled power generation start time $T_2$ to the scheduled stop time $T_3$ based on heat recovery efficiency $E_{WH}$ according to a formula (4).

$$H_{FCt} = W_t / E_{WE} \cdot E_{WH} \qquad (4)$$

In step S115A, the fourth calculating means 36 calculates heat supply system heating calories $Q_{GHt}$ required when the heat supply system 35 supplies the heat corresponding to the recovered heating calories $H_{FCt}$, based on heat supply system heat efficiency $E_H$ according to a formula (5). Herein, the heat supply system heating calories $Q_{GHt}$ are calculated as city gas amount and steam amount when supplied as a city gas and as steam, respectively. In addition, the fourth calculating means 36 calculates primary energy amount $A_{Ht}$ of primary energy consumed when the heat supply system 35 supplies $H_{FCt}$ based on primary energy amount $A_{GHB}$ per unit heating calorie of the heat supply system 35 according to a formula (6A), and integrates $A_{Ht}$ from $T_2$ to $T_3$ to obtain heat supply system primary energy amount $A_H$.

$$Q_{GHt} = H_{FCt} / E_H \qquad (5)$$

$$A_{Ht} = Q_{GHt} \cdot A_{GHB} \qquad (6A)$$

In step S116A, the operation control means 19 compares a sum of the power system primary energy amount $A_E$ and the heat supply system primary energy amount $A_H$ to the first fuel cell primary energy amount $A_{FC1}$. When $A_{FC1}$ is not more than $A_E + A_H$, the operation control means 19 advances the process to step S117A, in which the operation control means 19 decides the scheduled start-up time $T_1$, the scheduled power generation start-up time $T_2$, and the stop scheduled stop time $T_3$. In step S119A, the operation control means 19 starts-up the fuel cell system at the scheduled start-up time $T_1$. On the other hand, when $A_{FC1}$ is more than $A_E + A_H$, the operation control means 19 advances the process to step S120A, in which the operation control means 19 cancels assumption the scheduled start-up time $T_1$, the scheduled power generation start time $T_2$, and the scheduled stop time $T_3$, i.e., prohibits the start-up of the fuel cell 13 at the scheduled start-up time $T_1$. In step S120A, the operation control means 19 assigns the scheduled stop time $T_3$ to the time T, and returns the process to step S4 from II in FIG. 2 which follows II in FIG. 7 to repeat the following steps.

In accordance with the construction and operation of the fuel cell system of this embodiment, when the heat generated in association with the power generation in the fuel cell system is recovered and consumed, it is possible to reflect reduction of the amount of primary energy of the heat supply system which may be caused by supplying the recovered heat, in addition to the effect described in the first embodiment, and thus the fuel cell system can be operated while inhibiting wasteful energy consumption.

Embodiment 5

Figure 8:
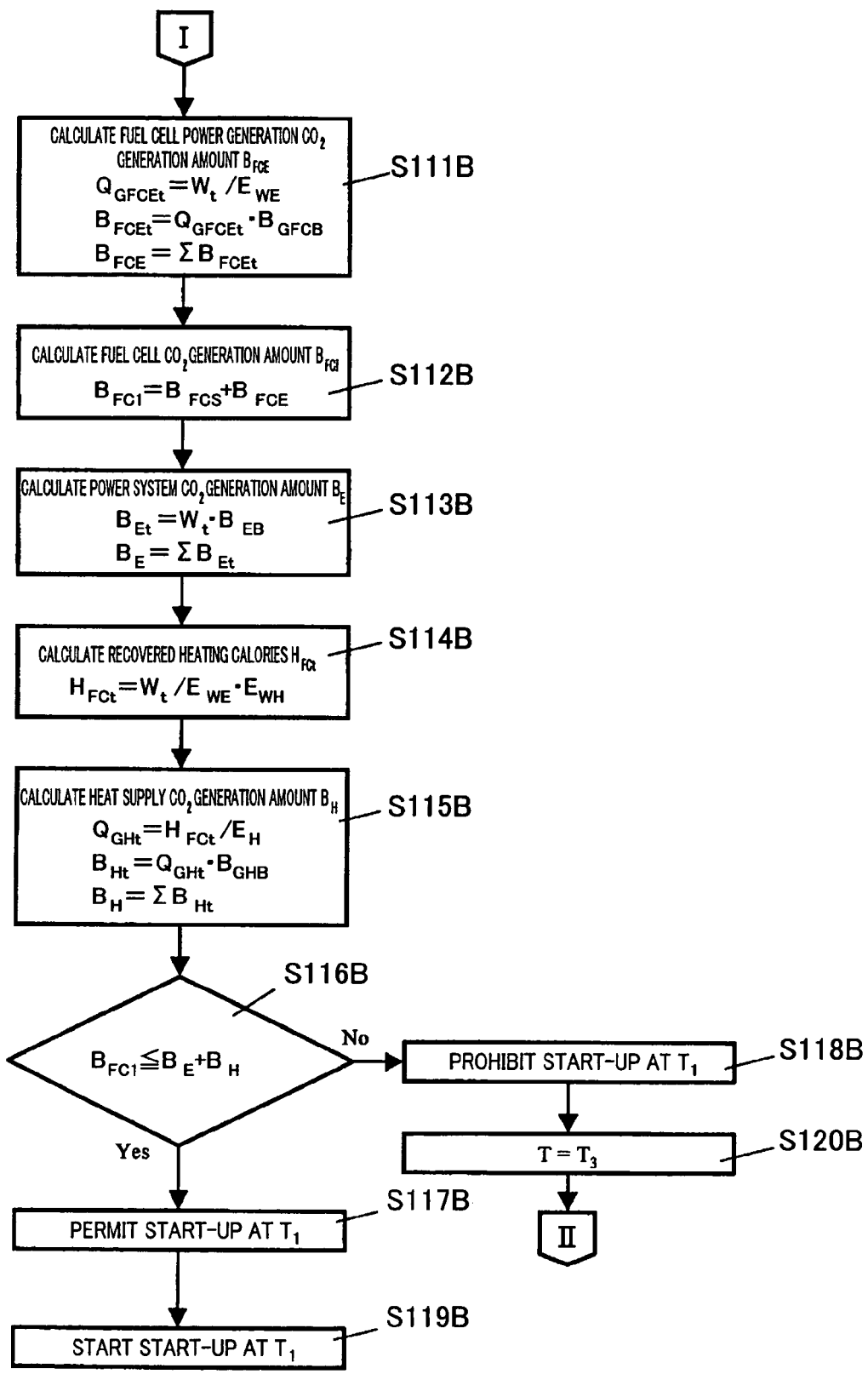
FIG. 8 is a flowchart showing a latter half of a flow of a control of a fuel cell system according to a fifth embodiment of the present invention.

FIG. 8 is a flowchart showing a latter half of a flow of a control of a fuel cell system according to a fifth embodiment of the present invention. In the fifth embodiment, the operation control means 19 of the fuel cell system of the fourth embodiment is configured to compare the amount of generated $CO_2$ and to decide the scheduled start-up time $T_1$, the scheduled power generation start time $T_2$, and the scheduled stop time $T_3$. Specifically, the first calculating means 20 calculates the amount of $CO_2$ generated when the fuel cell 13 generates electric power corresponding to power value of power value data for a predetermined time period. The second calculating means 21 calculates the amount of $CO_2$ generated when the power system supplies the electric power corresponding to the power value of the power value data for the predetermined time period. The third calculating means 22 calculates the amount of $CO_2$ generated when the fuel system including the fuel cell 13 and the fuel generator 11, etc, starts-up. The fourth calculating means 36 calculates the amount of $CO_2$ generated when the heat supply system 35 supplies the heat of heating calories corresponding to the heating calories of the heat recovered in the fuel cell system according to the power value of the power value data for the predetermined time period.

Since the construction of the fuel cell system and a flowchart showing a former half of the flow of the control of the fuel cell system is identical to that of FIG. 6 of the fourth embodiment and that of FIG. 2 of the first embodiment, it will not be described.

Hereinbelow, the latter half of the flow of the control of the fuel cell system will be described.

After assuming the scheduled start-up time $T_1$, the scheduled power generation start time $T_2$, and the scheduled stop time $T_3$ of the fuel cell 13 in the steps including the step S10 in FIG. 2, the operation control means 19 advances the process to steps after I in FIG. 8 which follows I in FIG. 2, and decides the scheduled start-up time $T_1$, the scheduled power generation start time $T_2$, and the scheduled stop time $T_3$ considering the amount of $CO_2$ generated.

The steps S111B to S113B are identical to the steps S11B to S13B in FIG. 4 of the second embodiment, and will not be described.

The step S114B is identical to the step S114A in FIG. 7 of the fourth embodiment, and therefore will not be described.

In step S115B; the fourth calculating means 36 calculates heat supply system heating calories $Q_{GHt}$ necessary when the heat supply system 35 supplies the heat of the recovered heating calories $H_{FCt}$ based on the heat supply system heat efficiency $E_H$ according to a formula (5). In addition, the fourth calculating means 36 calculates the $CO_2$ generation amount $B_{Ht}$ when the heat supply system 35 supplies the heat of $H_{FCt}$ based on the $CO_2$ generation amount $B_{GHB}$ per unit heating calorie of the heat supply system 35 according to a formula (6B), and integrates $B_{Ht}$ from $T_2$ to $T_3$ to obtain heat supply system $CO_2$ generation amount $B_H$.

$$B_{Ht} = Q_{GHt} \cdot B_{GHB} \qquad (6B)$$

In step S116B, the operation control means 19 compares a sum of the power system $CO_2$ generation amount $B_E$ and the heat supply system $CO_2$ generation amount $B_H$ to the first fuel cell $CO_2$ generation amount $B_{FC1}$.

When $B_{FC1}$ is not more than $B_E + B_H$, the operation control means 19 advances the process to Step S117B, in which the operation control means 19 decides the scheduled start-up time $T_1$, the scheduled power generation start time $T_2$, and the scheduled stop time $T_3$ of the fuel cell 13. In step S119B, the operation control means 19 starts-up the fuel cell system at the scheduled start-up time $T_1$. On the other hand, when $B_{FC1}$ is more than $B_E+B_H$, the operation control means 19 advances the process to step S120B, in which the operation control means 19 cancels assumption of the scheduled start-up time $T_1$, the scheduled power generation start time $T_2$, and the scheduled stop time $T_3$, i.e., prohibits the start-up of the fuel cell 13 at the scheduled start-up time $T_1$. In step S120B, the operation control means 19 assigns the scheduled stop time $T_3$ to the time T, and returns the process to Step S4 from II in FIG. 2 which follows II in FIG. 8 to repeat the following steps.

In accordance with the construction and operation of the fuel cell system of this embodiment, when the heat generated in association with the power generation in the fuel cell system is recovered and consumed, it is possible to reflect reduction of the amount of $CO_2$ generated in association with the power generation in the fuel cell system, which may be caused by supplying the recovered heat, in addition to the effect described in the second embodiment, and hence the fuel cell system can be operated while contributing prevention of global warming.

Embodiment 6

Figure 9:
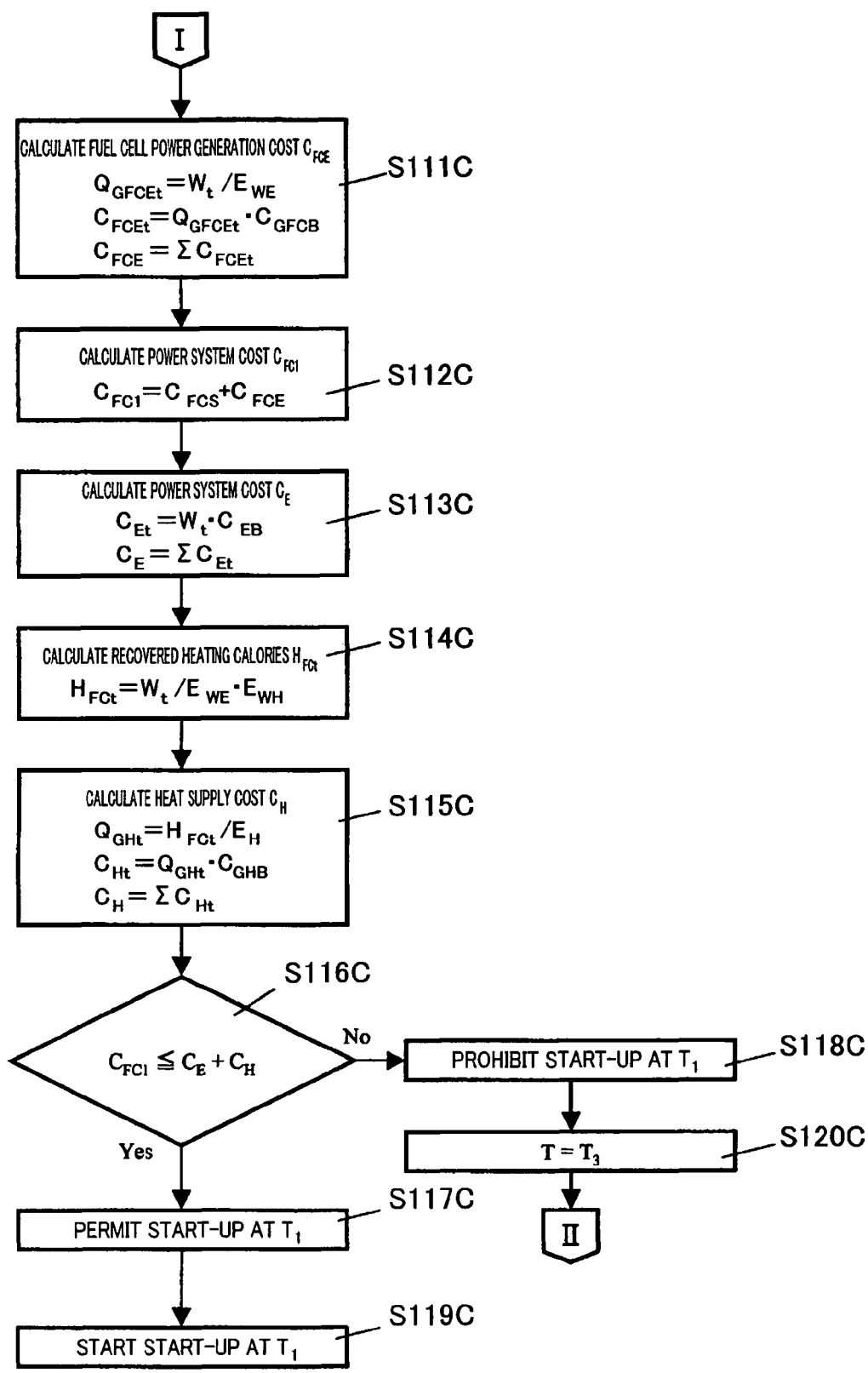
FIG. 9 is a flowchart showing a latter half of a flow of a control of a fuel cell system according to a sixth embodiment of the present invention.

FIG. 9 is a flowchart showing a latter half of a flow of a control of a fuel cell system according to a sixth embodiment of the present invention. In the sixth embodiment, the operation control means 19 of the fuel cell system of the fourth embodiment is configured to compare costs and to decide the scheduled start-up time $T_1$, the scheduled power generation start time $T_2$, and the scheduled stop time $T_3$. Specifically, the first calculating means 20 calculates a cost necessary when the fuel cell 13 generates electric power corresponding to power value of power value data for a predetermined time period. The second calculating means 21 calculates a cost necessary when the power system supplies the electric power corresponding to the power value of the power value data for the predetermined time period. The third calculating means 22 calculates a cost necessary when the fuel cell system including the fuel cell 13, the fuel generator 11, etc, starts-up. The fourth calculating means 36 calculates a cost necessary when the heat supply system 35 supplies the heat of the heating calories corresponding to heating calories of the heat recovered in the fuel cell system according to the power value of the power value data for the predetermined time period.

Since a construction of the fuel cell system according to the sixth embodiment and a flowchart showing a former half of the flow of the control of the fuel cell system are identical to those of FIG. 6 of the fourth embodiment and FIG. 2 of the first embodiment, they will not be further described.

Hereinbelow, the latter half part of the control of the fuel cell system will be described.

After assuming the scheduled start-up time $T_1$, the scheduled power generation start time $T_2$, and the scheduled stop time $T_3$ of the fuel cell 13 in the steps including the step S10 in FIG. 2, the operation control means 19 advances the process to steps after I in FIG. 9 which follows I in FIG. 2, and decides the scheduled start-up time $T_1$, the scheduled power generation start time $T_2$, and the scheduled stop time $T_3$, considering the cost.

The steps S111C to S113C are identical to the steps S11C to S13C in FIG. 5 of the third embodiment, and therefore will not be described.

The step S114C is identical to the step S114A in FIG. 7 of the fourth embodiment, and will not be described.

In step S115C, the fourth calculating means 36 calculates heat supply system heating calories $Q_{GHt}$ necessary when the heat supply system 35 supplies the heat of recovered heating calories $H_{FCt}$ based on the heat supply system heat efficiency $E_H$ according to the formula (5). In addition, the fourth calculating means 36 calculates cost $C_{Ht}$ necessary when the heat supply system 35 supplies the heat of $H_{FCt}$ based on metered fare $C_{GHB}$ of the heat supply system 35 according to a formula (6C), and integrates $C_{Ht}$ from $T_2$ to $T_3$ to obtain heat supply system cost $C_H$.

$$C_{Ht}=Q_{GHt} \cdot C_{GHB} \qquad (6C)$$

In step S116C, the operation control means 19 compares a sum of the power system cost $C_E$ and the heat supply system cost $C_H$ to the first fuel cell cost $C_{FC1}$. When $C_{FC1}$ is not more than $C_E+C_H$, the operation control means 19 advances the process to step S117C, in which the operation control means 19 decides the scheduled start-up time $T_1$, the scheduled power generation start time $T_2$, and the scheduled stop time $T_3$ of the fuel cell 13. In step S119C, the operation control means 19 starts-up the fuel cell system at the scheduled start-up time $T_1$. On the other hand, when $C_{FC1}$ is more than $C_E+C_H$, the operation control means 19 advances the process to step S120C, in which the operation control means 19 cancels assumption of the scheduled start-up time $T_1$, the scheduled power generation start time $T_2$, and the scheduled stop time $T_3$, i.e., prohibits the start-up the fuel cell 13 at the scheduled start-up time $T_1$. In step S120C, the operation control means 19 assigns the scheduled stop time $T_3$ to the time T, and returns the process to step S4 from II in FIG. 2 which follows II in FIG. 9 to repeat the following steps.

In accordance with the construction and operation of the fuel cell system of this embodiment, when the heat generated in association with the power generation in the fuel cell system is recovered and consumed, it is possible to reflect reduction of the cost of the heat supply system, which may be caused by supplying the recovered heat, in addition to the effect described in the third embodiment, and thus the fuel cell system can be operated economically.

Embodiment 7

Figure 10:
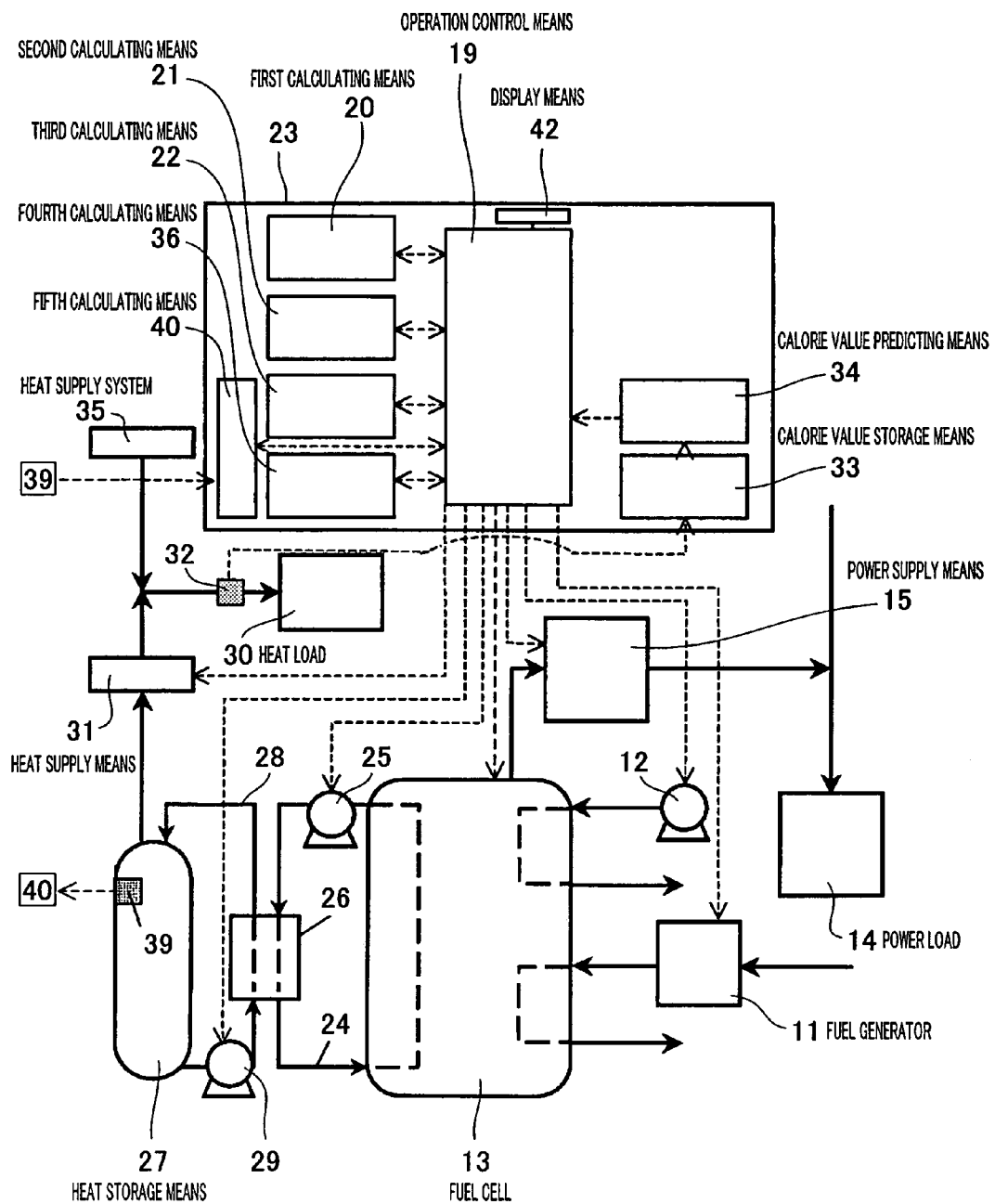
FIG. 10 is a view of a construction of a fuel cell system according to a seventh embodiment of the present invention.

FIG. 10 is a view of a construction of a fuel cell system according to a seventh embodiment of the present invention. In FIG. 10, the same reference numerals as those of the fourth embodiments denote the same or corresponding parts, which will not be described.

The fuel cell system of this embodiment comprises a calorie value detecting means 32 configured to detect heating calories of heat consumed in the heat load 30, instead of the power value detecting means 16 of the fuel cell system in FIG. 6, and further comprises a stored heat amount detecting means 39 configured to detect heating calories stored in the heat storage means 27.

The controller 23 includes, instead of the power value storage means 17 and the power value predicting means 18, a heating calorie value storage means 33 configured to store a value detected by the calorie value detecting means 32, and a calorie value predicting means 34 configured to predict a calorie value $H_t$ (calorie value $H_t$ after t minutes) of heating calories of the heat consumed in the heat load 30 from a history of calorie values stored and to store calorie value data including the calorie values $H_t$. The controller 23 further includes first to fifth calculating means 20, 21, 22, 36, and 40 configured to perform calculation based on the calorie value data and to give calculation data to the operation control means 19.

The first calculating means 20 calculates the amount of primary energy consumed when the fuel cell 13 supplies the heat of heating calories corresponding to calorie value of calorie value data for a predetermined time period to the heat storage means 27. The second calculating means 21 calculates an amount of electric power supplied to the power load 14 when the fuel cell 13 supplies the heat of the heating calories corresponding to the calorie value of the calorie value data for the predetermined time period, and the amount of primary energy consumed when the power system supplies the amount of electric power. The third calculating means 22 calculates the amount of primary energy consumed when the fuel cell system including the fuel cell 13, the fuel generator 11, etc starts-up. The fourth calculating means 36 calculates the amount of primary energy consumed when the heat supply system 35 supplies the heat of the heating calories corresponding to the calorie value of the calorie value data for the predetermined time period. The fifth calculating means 40 is configured to calculate a predicted value of heat storage balance of the heat storage means 27 based on the heating calories stored in the heat storage means 27 which is obtained based on the detected value of the stored heat amount detecting means 39, the calorie value data, etc.

Figure 11:
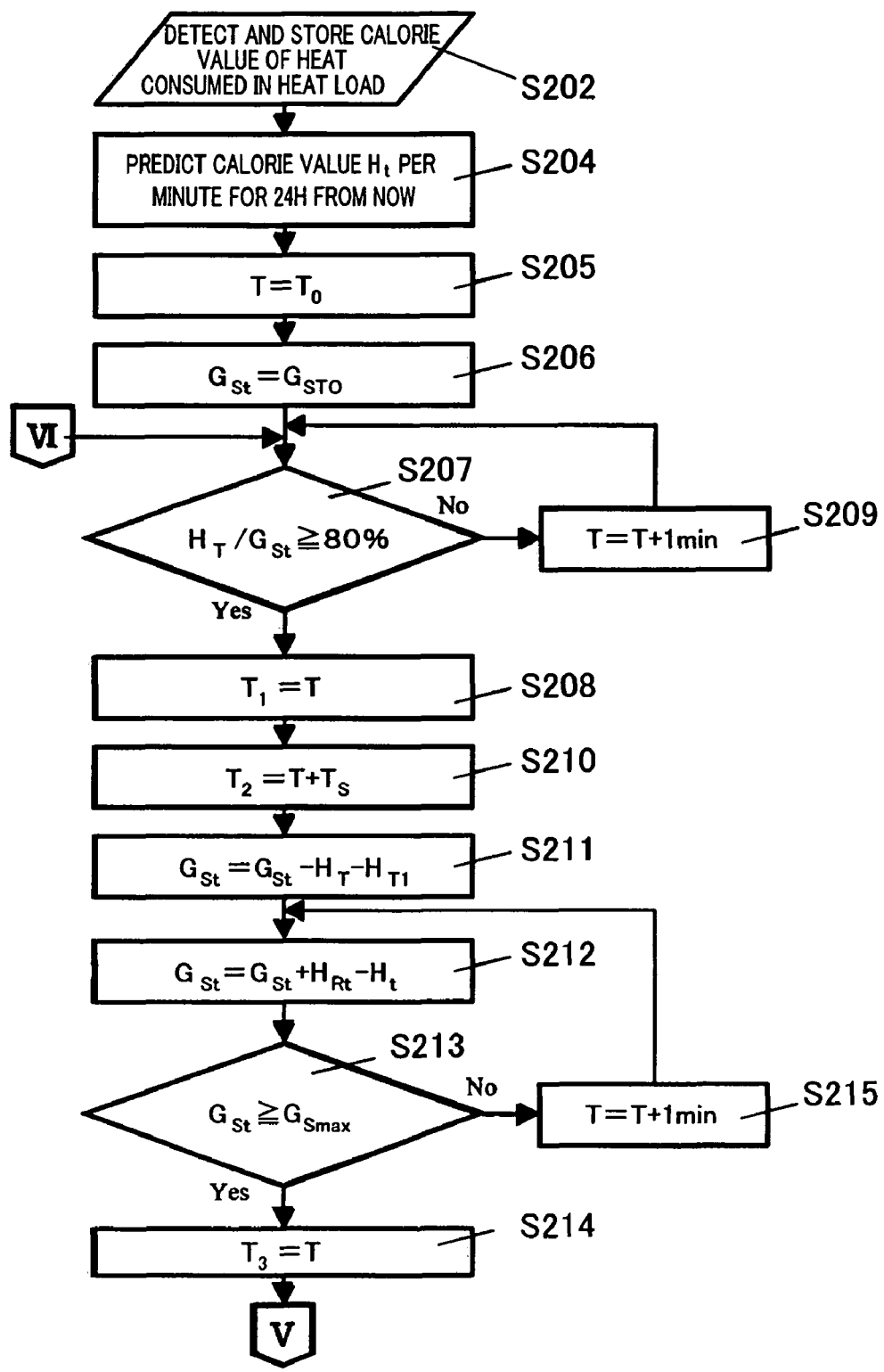
FIG. 11 is a flowchart showing a former half of a flow of a control of a fuel cell system according to the seventh embodiment of the present invention.
Figure 12:
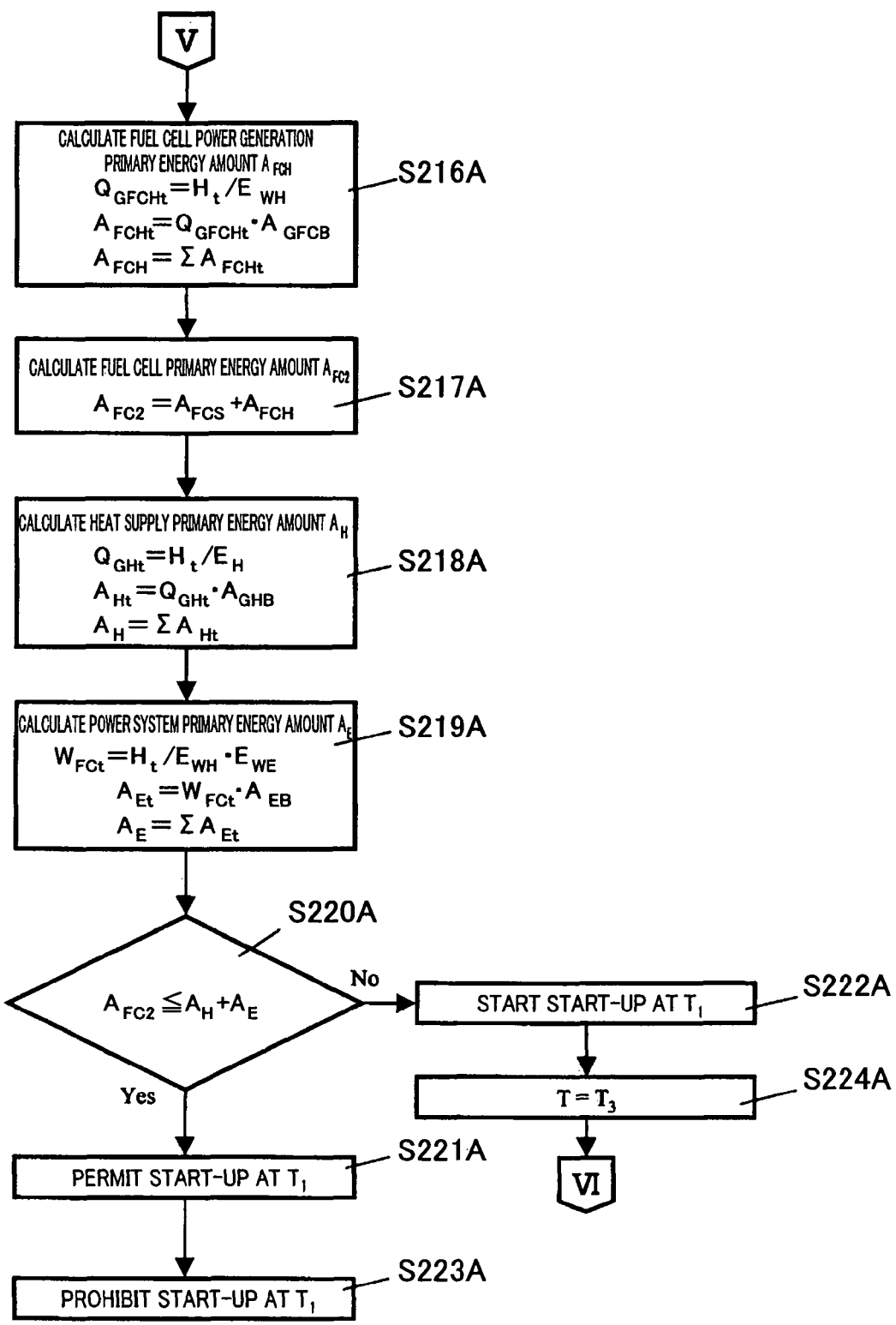
FIG. 12 is a flowchart showing a latter half of the flow of the control of the fuel cell system according to the seventh embodiment of the present invention.

An operation performed before and at the start-up of the fuel cell in the embodiment so constructed will be described. FIGS. 11 and 12 are flowcharts showing a flow of a control of the fuel cell system. Referring to FIG. 11, in step S202, the calorie value detecting means 32 continuously detects a calorie value, and the calorie value storage means 33 stores the detected calorie value. Herein, the calorie value detecting means 32 detects the calorie value in each second.

In step S204, the calorie value predicting means 34 predicts a calorie value Ht per minute of heat which may be consumed in the heat load 30 for 24 hours from now based on the history of the calorie values stored in the calorie value storage means 33, and to store it as the calorie value data.

Subsequently, the operation control means 19 assumes time when the amount of heat stored in the heat storage means 27 may become less as the scheduled start-up time $T_1$ based on the calorie value data stored in the calorie value predicting means 34.

Herein, in step S205, the operation control means 19 assigns current time $T_0$ to the time T.

In step S206, the fifth calculating means calculates stored heat amount $G_{ST0}$ at the current time $T_0$ based on the value detected by the stored heat amount detecting means 39. And, the operation control means 19 assigns the stored heat amount $G_{ST0}$ to the stored heat amount $G_{St}$ at time T.

In step S207, the operation control means 19 determines whether or not an integrated value $H_T$ of the calorie values $H_t$ from the current time $T_0$ to the time T is not less than Y % (for example, 80% or more) of the stored heat amount $G_{St}$. When Yes, the operation control means 19 advances the process to step S208, and assumes T as the scheduled start-up time $T_1$. When No, the operation control means 19 advances the process to step S209, in which the operation control means 19 assumes time one minute after from T as T (T=T+1 min). Then, the operation control means 19 returns the process to step S207.

In step S210, the operation control means 19 adds the start-up time $T_s$ (for example, 60 minutes) to the time T and assumes it as the scheduled power generation start time $T_2$.

Subsequently, the operation control means 19 assumes a time when the heat stored in the heat storage means 27 may become sufficient as the scheduled stop time $T_3$ based on the calorie value data stored in the calorie value predicting means 34.

In step S211, the fifth calculating means 40 calculates a start-up calorie value $H_{T1}$ by integrating the calorie values $H_t$ of the calorie value data for the time period from the scheduled start-up time $T_1$ to the scheduled power generation start time $T_2$ and assigns a value obtained by subtracting H T and $H_{T1}$ from $G_{St}$ to $G_{St}$.

In step S212, the fifth calculating means 40 calculates the stored heat amount $G_{St}$ by adding the recovered heat amount $H_{Rt}$ from the fuel cell 13 to the stored heat amount $G_{St}$ at time T and by subtracting the calories $H_t$ of the calorie value data at the time T.

In step S213, the operation control means 19 determines whether or not the stored heat amount $G_{St}$ is not less than maximum heat storage amount $G_{Smax}$ of the heat storage means 27 at the time T. When Yes, the operation control means 19 assumes the T as the scheduled stop time $T_3$ in step S214. When No, the operation control means 19 assumes time one minute after the T as the T in step S215, and returns the process to step S212.

After assuming the scheduled start-up time $T_1$, the scheduled power generation start time $T_2$, and the scheduled stop time $T_3$ of the fuel cell 13 in the manner as described above, the operation control means 19 advances the process to step after V in FIG. 12 which follows V in FIG. 11, and determines the scheduled start-up time $T_1$, the scheduled power generation start time $T_2$, and the scheduled stop time $T_3$ of the fuel cell 13, considering the amount of primary energy consumed.

In step S216A, the first calculating means 20 calculates a feed gas amount $Q_{GFCHt}$ necessary for power generation of the calorie value Ht per minute of the calorie value data for the time period from the scheduled power generation start time $T_2$ to the scheduled stop time $T_3$, based on the heat recovery efficiency $E_{WH}$ of the fuel cell system including the fuel cell 13, the fuel generator 11, etc, according to a formula (7), when the fuel cell 13 generates and supplies electric power. In addition, the first calculating means 20 calculates primary energy amount $A_{FCHt}$ of primary energy consumed when the fuel cell system generates the electric power and supplies the electric power and the heat for the time period from the scheduled power generation start time $T_2$ to the scheduled stop time $T_3$, based on the primary energy amount $A_{GFCB}$ per unit feed gas according to a formula (8A), and integrates $A_{FCHt}$ from $T_2$ to $T_3$ to obtain fuel cell power generation primary energy amount $A_{FCH}$.

$$Q_{GFCHt} = H_t / E_{WH} \quad (7)$$

$$A_{FCHt} = Q_{GFCHt} \cdot A_{GFCB} \quad (8A)$$

In step S217A, the third calculating means 22 calculates the primary energy amount of primary energy consumed when the fuel cell system starts-up to obtain fuel cell start-up primary energy amount $A_{FCS}$. In addition, the operation control means 19 adds the fuel cell power generation primary energy amount $A_{FCH}$ output from the first calculating means 20 to the fuel cell start-up primary energy amount $A_{FCS}$ output from the third calculating means 22 to obtain second fuel cell primary energy amount $A_{FC2}$.

In step S218A, the fourth calculating means 36 calculates heat supply system heating calories $Q_{GHt}$ required when the heat supply system 35 supplies the heat of the calorie value $H_t$, based on the heat supply system heat efficiency $E_H$ according to a formula (9). In addition, the fourth calculating means 36 calculates primary energy amount $A_{Ht}$ of primary energy consumed when the heat supply system 35 supplies the heat of $H_t$ based on the primary energy amount $A_{GHB}$ per unit heating calorie of the heat supply system 35 according to a formula (10A), and integrates $A_{Ht}$ from $T_2$ to $T_3$ to obtain heat supply system primary energy amount $A_H$.

$$Q_{GHt}=H_t/E_H \quad (9)$$

$$A_{Ht}=Q_{GHt} \cdot A_{GHB} \quad (10A)$$

In step S219A, the second calculating means 20 calculates power value $W_{FCt}$ of the electric power generated when the fuel cell system generates and supplies electric power of the calorie value $H_t$ per minute of the calorie value data for the time period from the scheduled power generation start time $T_2$ to the scheduled stop time $T_3$ based on the power generation efficiency $E_{WE}$ according to a formula (11), calculates primary energy amount $A_{Et}$ of the primary energy when the power system supplies $W_{FCt}$ according to a formula (12A), and integrates $A_{Et}$ from $T_2$ to $T_3$ to obtain power system primary energy amount $A_E$.

$$W_{FCt}=H_t/E_{WH} \cdot E_{WE} \quad (11)$$

$$A_{Et}=W_{FCt} \cdot A_{EB} \quad (12A)$$

In step S220A, the operation control means 19 compares a sum of the power system primary energy amount $A_E$ and the heat supply system primary energy amount $A_H$ to the second fuel cell primary energy amount $A_{FC2}$. When $A_{FC2}$ is not more than $A_E+A_H$, the operation control means 19 advances the process to step S221A, in which the operation control means 19 decides the scheduled start-up time $T_1$, the scheduled power generation start time $T_2$, and the scheduled stop time $T_3$ of the fuel cell 13. In step S223A, the operation control means 19 starts-up the fuel cell system, at the scheduled start-up time $T_1$. On the other hand, when $A_{FC2}$ is more than $A_E+A_H$, the operation control means 19 advances the process to step S222, in which the operation control means 10 cancels assumption of the scheduled start-up time $T_1$, the scheduled power generation start time $T_2$, and the scheduled stop time $T_3$ of the fuel cell 13, i.e., prohibits the start-up of the fuel cell 13 at the scheduled start-up time $T_1$. In step S224, the operation control means 19 assigns the scheduled stop time $T_3$ to the time T. Then, the operation control means 19 returns the process to step S207 from VI in FIG. 11 which follows VI in FIG. 12 and repeats the following steps.

In accordance with the construction and the operation of the fuel cell system of this embodiment, in the heat load responsive operation of the fuel cell system which is configured to supply heat and electric power, reduction of the amount of the power system primary energy can be reflected. Therefore, the fuel cell system can be operated while inhibiting wasteful energy consumption.

In addition, although not shown, the fuel cell system may have the construction of the seventh embodiment and the construction of the fourth embodiment, and the controller 23 may be provided with a select switch (not shown) by which the seventh embodiment or the fourth embodiment is selected. In such a construction, a heat load responsive operation or a power load responsive operation can be selected according to the use condition of the fuel cell system.

Further, by storing the power value and the calorie value in the power value storage means 17 and the calorie value storage means 33, respectively in such a manner that they may be distinguished between "a case where the user is at home" and "a case where the user is away from home," the power value predicting means 18 and the calorie value storage means 34 can construct the power value data and the calorie value data according to selection of "the case where the user is at home" or "the case where the user is away from home." Specifically, the controller 23 may be provided with a selecting means which the user selects "at home" or "away from home," so that the power value and the calorie value may be stored in the power value storage means 17 and the calorie value storage means 33, respectively in such a manner that they may be distinguished between "the case where the user is at home" and "the case where the user is away from home." Thereby, it is possible to predict the power value and the calorie value more accurately.

Moreover, the controller 23 may be equipped with an operation time input means (not shown) by which the user can set the scheduled start-up time $T_1$, the scheduled power generation start time $T_2$, and the scheduled stop time $T_3$ of the fuel cell 13 as desired. This makes it possible to operate the fuel cell system more appropriately considering planned activity of the user.

Embodiment 8

Figure 13:
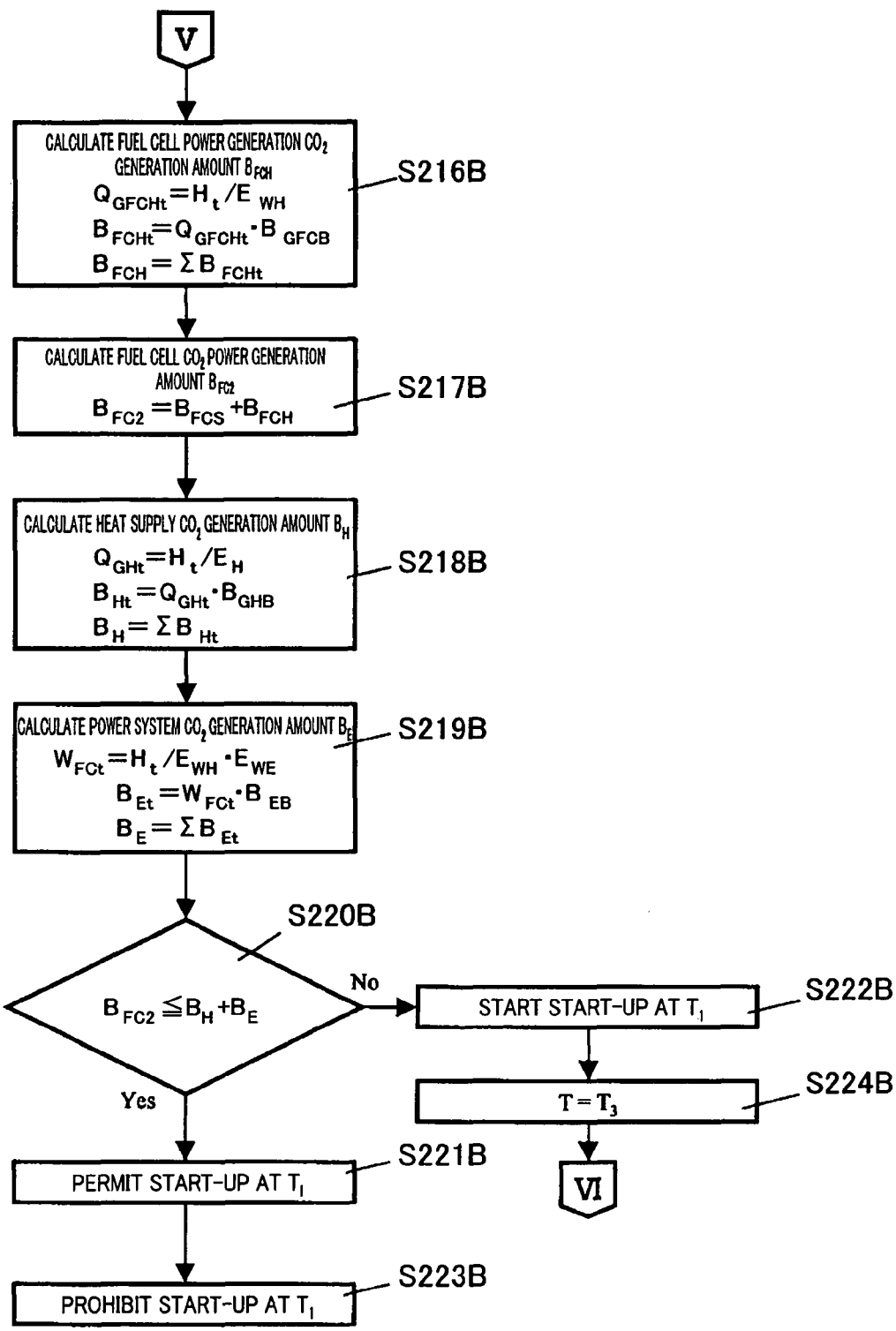
FIG. 13 is a flowchart showing a latter half of a flow of a control of a fuel cell system according to an eighth embodiment of the present invention.

FIG. 13 is a flowchart showing a latter half of a flow of a control of a fuel cell system according to an eighth embodiment of the present invention. In the eighth embodiment, the operation control means 19 of the fuel cell system in the seventh embodiment is configured to compare $CO_2$ generation amount and to decide the scheduled start-up time $T_1$, the scheduled power generation start time $T_2$, and the scheduled stop time $T_3$ of the fuel cell 13. Specifically, the first calculating means 20 calculates the amount of $CO_2$ generated when the fuel cell 13 supplies heat corresponding to a calorie value of calorie value data for a predetermined time period to the heat storage means 27. The second calculating means 21 calculates an amount of electric power supplied to the power load 14 when the fuel cell 13 supplies the heat corresponding to the calorie value of the calorie value data for the predetermined period and the amount of $CO_2$ generated when the power system supplies the amount of electric power. The third calculating means 22 calculates the amount of $CO_2$ generated when the fuel cell system including the fuel cell 13, the fuel generator 11, etc, starts-up. The fourth calculating means 36 calculates the amount of $CO_2$ generated when the heat supply system 35 supplies heat corresponding to the calorie value of the calorie value data for the predetermined time period.

Since the construction of the fuel cell system of the eighth embodiment and the flowchart showing a former half of the flow of the control of the fuel cell system are identical to those in FIGS. 10 and 11 of the seventh embodiment, they will not be described.

Hereinbelow, a latter half of the flow of the control of the fuel cell system will be described.

Referring to FIG. 13, in step S216B, the first calculating means 20 calculates a feed gas amount $Q_{GFCHt}$ required for power generation of the calorie value $H_t$ per minute of the calorie value data for the time period from the scheduled power generation start time $T_2$ to the scheduled stop time $T_3$ based on the heat recovery efficiency $E_{WH}$ of the fuel cell system according to the formula (7). In addition, the first calculating means 20 calculates the $CO_2$ generation amount $B_{FCHt}$ of $CO_2$ generated when the fuel cell system generates electric power for the time period from the scheduled power generation start time $T_2$ to the scheduled stop time $T_3$ and supplies the electric power and heat, based on the $CO_2$ power generation amount $B_{GFCB}$ per unit feed gas according to a formula (8B), and integrates $B_{FCHt}$ from $T_2$ to $T_3$ to obtain fuel cell power generation $CO_2$ amount $B_{FCH}$.

$$B_{FCHt}=Q_{GFCHt} \cdot B_{GFCB} \quad (8B)$$

In step S217B, the third calculating means 22 calculates the amount of $CO_2$ generated when the fuel cell system starts-up to obtain fuel cell start-up $CO_2$ generation amount $B_{FCS}$. In addition, the operation control means 19 adds the fuel cell power generation $CO_2$ generation amount $B_{FCH}$ output from the first calculating means 20 to the fuel cell start-up $CO_2$ generation amount $B_{FCS}$ output from the third calculating means 22 to obtain second fuel cell $CO_2$ generation amount $B_{FC2}$.

In step S218B, the fourth calculating means 36 calculates heat supply system heating calories $Q_{GHt}$ required when the heat supply system 35 supplies heat corresponding to the calorie value $H_t$ based on the heat supply system heat efficiency $E_H$ according to the formula (9). In addition, the fourth calculating means 36 calculates $CO_2$ generation amount $B_{Ht}$ generated when the heat supply system 35 supplies the heat of $H_t$ based on the $CO_2$ power generation amount $B_{GHB}$ per unit calorie of the heat supply system 35 according to a formula (10B), and integrates $B_{Ht}$ from $T_2$ to $T_3$ to obtain heat supply system $CO_2$ generation amount $B_H$.

$$B_{Ht} = Q_{GHt} \cdot B_{GHB} \tag{10B}$$

In step S219B, the second calculating means 21 calculates a power value $W_{FCt}$ of the electric power generated when the fuel cell system generates and supplies electric power corresponding to the calorie value. $H_t$ per minute of calorie value data for the time period from the scheduled power generation start time $T_2$ to the scheduled stop time $T_3$ based on the power generation efficiency EWE according to the formula (11), calculates $CO_2$ generation amount $B_{Et}$ of $CO_2$ generated when the power system supplies the electric power of $W_{FCt}$ according to a formula (12B) and integrates $B_{Et}$ from $T_2$ to $T_3$ to obtain power system $CO_2$ generation amount $B_E$.

$$B_{Et} = W_{FCt} \cdot B_{EB} \tag{12B}$$

In step S220B, the operation control means 19 compares a sum of the power system $CO_2$ generation amount $B_E$ and the heat supply system $CO_2$ generation amount $B_H$ to the fuel cell system $CO_2$ generation amount $B_{FC2}$. When $B_{FC2}$ is not more than $B_E + B_H$, the operation control means 19 advances the process to step S221B, in which the operation control means 19 decides the scheduled start-up time $T_1$, the scheduled power generation start time $T_2$, and the scheduled stop time $T_3$ of the fuel cell 13. In step S223B, the operation control means 19 starts-up the fuel cell system at the scheduled start-up time $T_1$. On the other hand, when $B_{FC2}$ is more than $B_E + B_H$, the operation control means 19 advances the process to step S222B, in which the operation control means 19 cancels assumption of the scheduled start-up time $T_1$, the scheduled power generation start time $T_2$, and the scheduled stop time $T_3$, i.e., prohibits the start-up of the fuel cell 13 at the scheduled start-up time $T_1$. In step S224B, the operation control means 19 assigns the scheduled stop time $T_3$ to the time T. Then, the operation control means 19 returns the process to step S207 from VI in FIG. 11 which follows VI in FIG. 13 and repeats the following steps.

In accordance with the construction and the operation of the fuel cell system of this embodiment, in the heat load responsive operation of the fuel cell system configured to supply the heat and the electric power, reduction of the amount of $CO_2$ generation in the power system can be reflected, and hence the fuel cell system can be operated while contributing to prevention of global warming.

Embodiment 9

Figure 14:
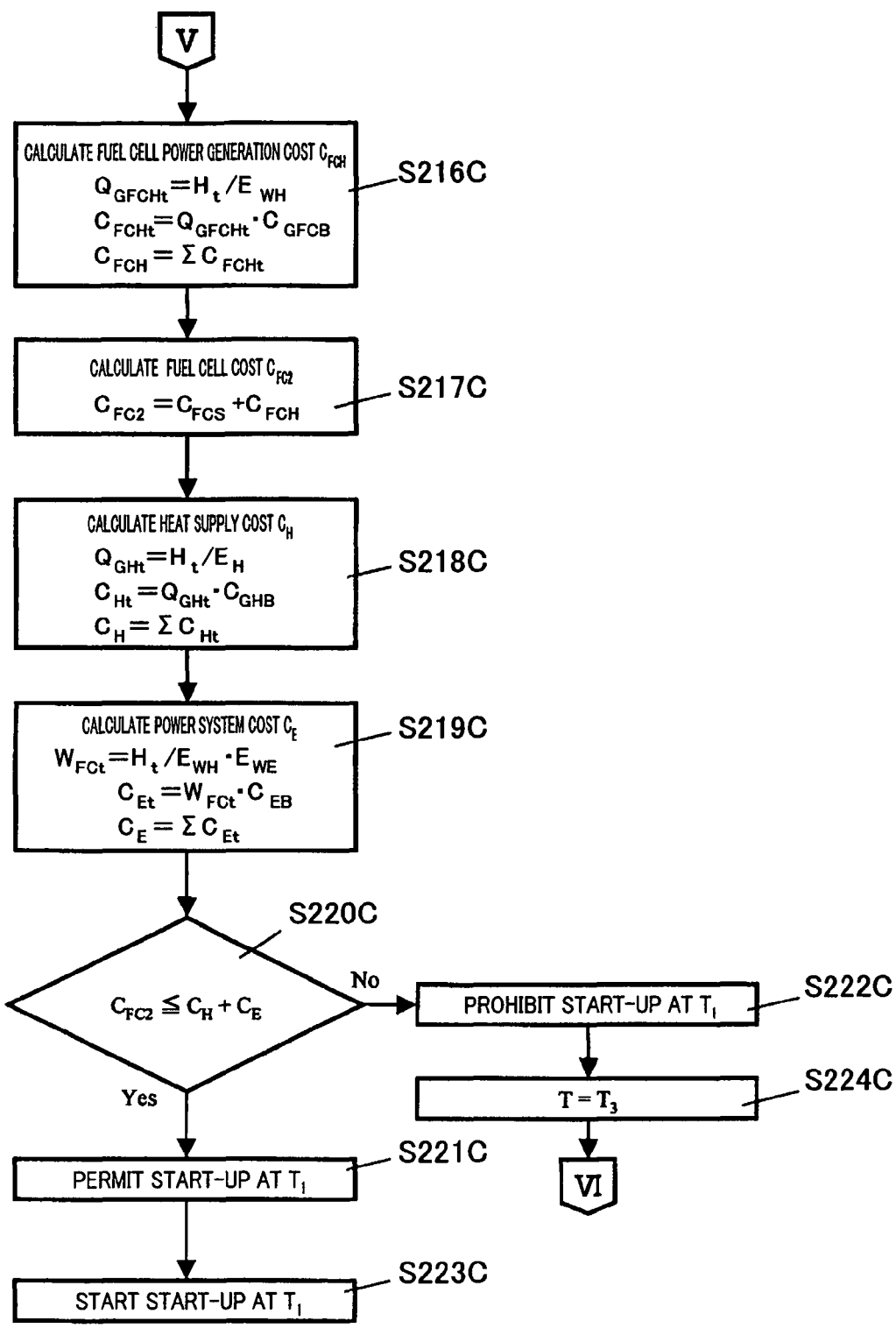
FIG. 14 is a flowchart showing a latter half of a flow of a control of a fuel cell system according to a ninth embodiment of the present invention.

FIG. 14 is a flowchart showing a latter half of a flow of a control of a fuel cell system according to a ninth embodiment of the present invention. In the ninth embodiment, the operation control means 19 of the fuel cell system of the seventh embodiment compares costs and to decide the scheduled start-up time $T_1$, the scheduled power generation start time $T_2$, and the scheduled stop time $T_3$. Specifically, the first calculating means 20 calculates a cost necessary when the fuel cell 13 supplies heat corresponding to a calorie value of calorie value data for a predetermined time period to the heat storage means 27. The second calculating means 21 calculates an amount of the electric power supplied from the fuel cell 13 to the power load 14 when the fuel cell 13 supplies the heat corresponding to the calorie value of the calorie value data for the predetermined time period and a cost necessary when the power system supplies the amount of electric power. The third calculating means 22 calculates a cost necessary when the fuel cell system including the fuel cell 13, the fuel generator 11, etc starts-up. The fourth calculating means 36 calculates a cost necessary when the heat supply system 35 supplies the heat corresponding to the calorie value of the calorie value data for the predetermined time period.

Since the construction of the fuel cell system of the ninth embodiment and the flowchart showing a former half of the flow of the control of the fuel cell system are identical to those in FIGS. 10 and 11 of the seventh embodiment, they will not be described.

Hereinbelow, the latter half of the flow of the control of the fuel cell system will be described.

Referring to FIG. 14, in step S216C, the first calculating means 20 calculates a feed gas amount $Q_{GFCHt}$ required for power generation of the power value $H_t$ per minute of the power value data for the time period from the scheduled power generation start time $T_2$ to the scheduled stop time $T_3$ when the fuel cell 13 generates and supplies the electric power based on the heat recovery efficiency $E_{WH}$ of the fuel cell system according to the formula (7). In addition, the first calculating means 20 calculates a cost $C_{FCHt}$ necessary when the fuel cell system generates the electric power and supplies the electric power and the heat for the time period from the scheduled power generation start time $T_2$ to the scheduled stop time $T_3$ based on the metered fare $C_{GFCB}$ of the feed gas according to a formula (8B), and integrates $C_{FCHt}$ from $T_2$ to $T_3$ to obtain a fuel cell power generation cost $C_{FCH}$.

$$C_{FCHt} = Q_{GFCHt} \cdot C_{GFCB} \tag{8C}$$

In step S217C, the third calculating means 22 calculates a cost necessary when the fuel cell system starts-up to obtain fuel cell start-up cost $C_{FCS}$. In addition, the operation control means 19 adds the fuel cell power generation cost $C_{FCH}$ output from the first calculating means 20 to the fuel cell start-up cost $C_{FCS}$ output from the third calculating means 22 to obtain a second fuel cost $C_{FC2}$.

In step S218C, the fourth calculating means 36 calculates heat supply system heating calories $Q_{GHt}$ required when the heat supply system 35 supplies the heat corresponding to the calorie value $H_t$ based on the heat supply system heat efficiency $E_H$ according to the formula (9). In addition, the fourth calculating means 36 calculates a cost $C_{Ht}$ necessary when the heat supply system 35 supplies the heat corresponding to $H_t$ based on the metered fare $C_{GHB}$ of the heat supply system 35 according to a formula (10C), and integrates $C_{Ht}$ from $T_2$ to $T_3$ to obtain the heat supply system cost $C_H$.

$$C_{Ht} = Q_{GHt} \cdot C_{GHB} \tag{10C}$$

In step S219C, the second calculating means 21 calculates a power value $W_{FCt}$ of the electric power generated when the fuel cell system generates and supplies the electric power corresponding to the calorie value $H_t$ per minute of the calorie value data from the scheduled power generation start time $T_2$ to the scheduled stop time $T_3$ based on the power generation efficiency $E_{WE}$ according to a formula (11), calculates cost $C_{Et}$ necessary when the power system supplies the electric power of $W_{FCt}$ according to a formula (12C), and integrates $C_{Et}$ from $T_2$ to $T_3$ to obtain power system cost $C_E$.

$$C_{Et} = W_{FCt} \cdot C_{EB} \qquad (12C)$$

In step S220C, the operation control means 19 compares a sum of the power system cost $C_E$ and the heat supply system cost $C_H$ to the fuel cell system cost $C_{FC2}$. When $C_{FC2}$ is not more than $C_E+C_H$, the operation control means 19 advances the process to step S221C, in which the operation control means 19 decides the scheduled start-up time $T_1$, the scheduled power generation start time $T_2$, and the scheduled stop time $T_3$. In step S223C, the operation control means 19 starts-up the fuel cell system at the scheduled start-up time $T_1$. On the other hand, when $C_{FC2}$ is more than $C_E+C_H$, the operation control means 19 advances the process to step S222C, in which the operation control means 19 cancels assumption of the scheduled start-up time $T_1$, the scheduled power generation start time $T_2$, and the scheduled stop time $T_3$, i.e., prohibits the start-up of the fuel cell 13 at the scheduled start-up time $T_1$. In step S224C, the operation control means 19 assigns the scheduled stop time $T_3$ to the time T. Then, the operation control means 19 returns the process to step S207 from VI in FIG. 11 which follows VI in FIG. 14 and repeats the following steps.

In accordance with the construction and the operation of the fuel cell system of this embodiment, reduction of the cost of the power system can be reflected in the heat load responsive operation of the fuel cell system configured to supply the heat and the electric power, and hence the fuel cell system can be operated economically.

Embodiment 10

Figure 15:
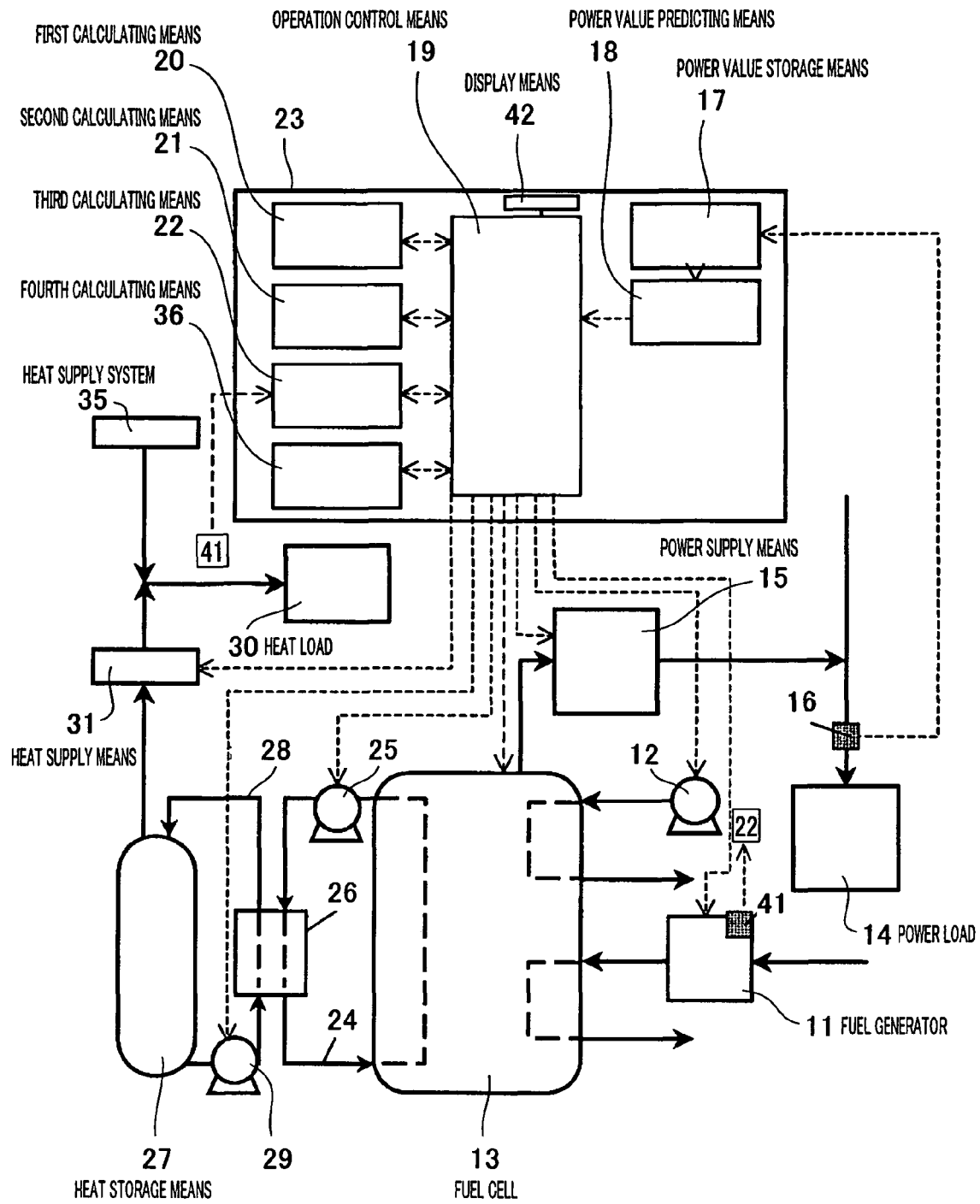
FIG. 15 is a view of a construction of a fuel cell system according to a tenth embodiment of the present invention.

FIG. 15 is a view showing a construction of a fuel cell system according to a tenth embodiment of the present invention. In FIG. 15, the same reference numerals as those of the fourth embodiment denote the same or corresponding parts, which will not be further described.

The fuel cell system of this embodiment comprises, in addition to the construction of the fuel cell system in FIG. 6, a temperature detecting means configured to directly or indirectly detect a temperature of a portion which controls a speed of the start-up of the fuel cell 13 at the start-up of the fuel cell 13. Herein, the fuel generator 11 is provided with a fuel generator temperature detecting means 41, or the fuel cell 13 may be provided with a fuel cell temperature detecting means, thereby providing similar effects.

Figure 16:
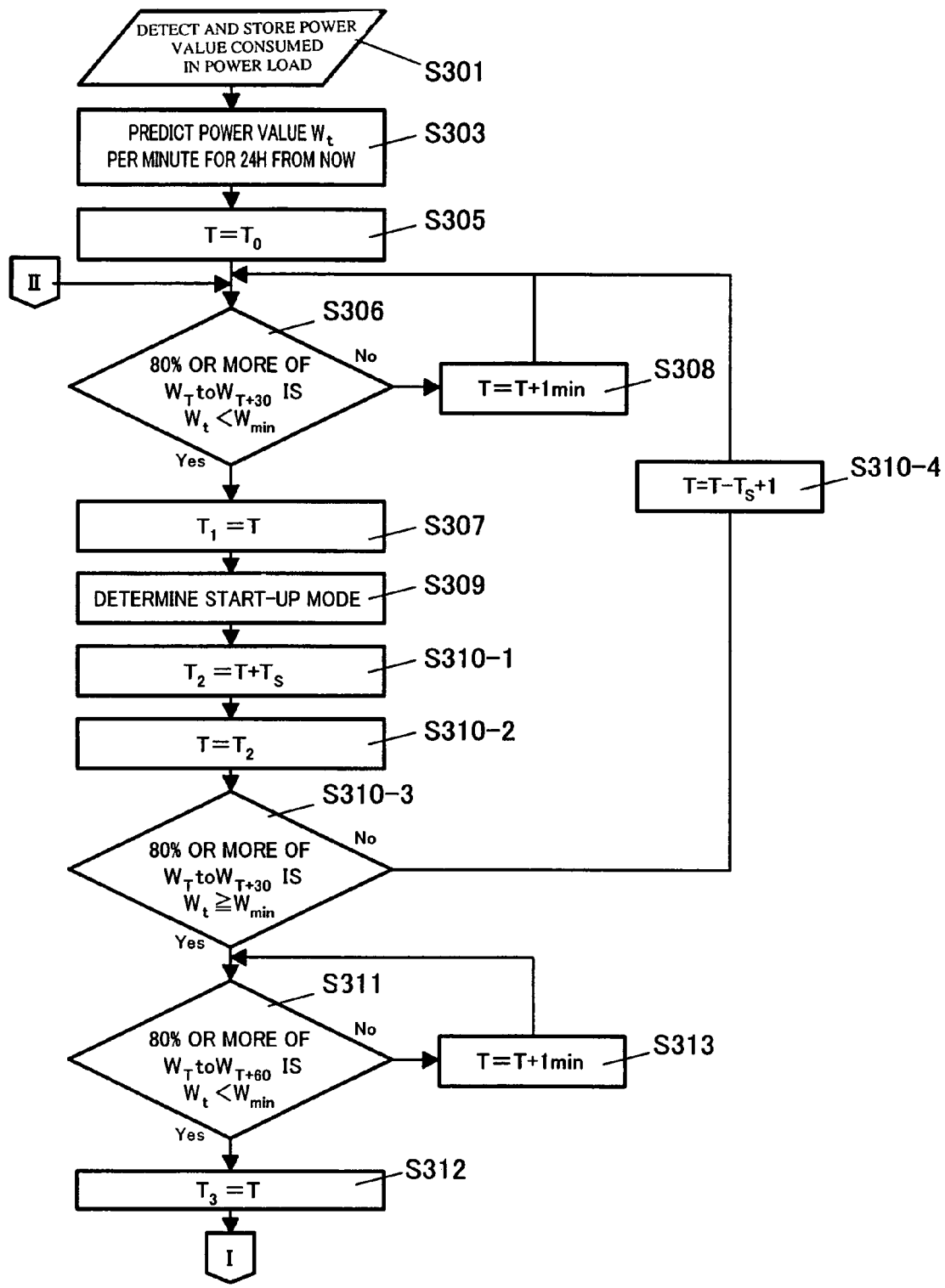
FIG. 16 is a flowchart showing a former half of a flow of a control of a fuel cell system according to the tenth embodiment of the present invention.

An operation performed before and at the start-up of the fuel cell 13 in the tenth embodiment constructed as described above will be described. FIG. 16 is a flowchart showing a front half portion of a flow of a control of the fuel cell system. Since steps S301 to S308 in FIG. 16 are identical to steps S1 to S6 in FIG. 2 of the first embodiment, they will not be described.

In step S309, the third calculating means 22 determines a start-up mode based on a temperature $K_0$ detected by the fuel generator detecting means 41 at current time $T_0$. Herein, a short start-up mode is used when the temperature $K_0$ is not less than a predetermined temperature $K_F$ and a long start-up mode is used when less than the predetermined temperature $K_F$. It should be noted that the temperature of the fuel generator 11 or the fuel cell 13 at the scheduled start-up time $T_1$ can be estimated from heat radiation amount which is a function between ambient temperature and the time period from the current time $T_0$ to the scheduled start-up time $T_1$. Accordingly, to determine the start-up mode, the temperature (start-up temperature) $K_1$ of the fuel generator 11 at the scheduled start-up time $T_1$ which is estimated using the function may be compared to the predetermined time $K_F$. Alternatively, a start-up mode correspondence table which contains variables of a temperature difference between the directed temperature $K_0$ and ambient temperature and the time from the current time $T_0$ to the scheduled start-up time $T_1$ may be created in advance and stored in the third calculating means 22, and the third calculating means 22 may select the start-up mode from the start-up mode correspondence table. In a further alternative, the third calculating means 22 may calculate the start-up time Ts based on a temperature difference between the start-up temperature $K_1$ and a temperature (power generation start temperature) $K_2$ required at the start of power generation.

In step S310-1, the operation control means 19 adds the start-up time $T_s$ (for example, 60 minutes in the long start-up mode and 30 minutes in the short start-up mode) preset according to each start-up mode to the time T and assumes it as the scheduled power generation time $T_2$.

In step S310-2, the operation control means 19 assigns the scheduled power generation time $T_2$ to T.

In step S310-3, the operation control means 19 determines whether or not Y % or more (for example, 80% or more, 24 values or more) of power values $W_t$ (30 values from $W_T$ to $W_{T+30}$) for a predetermined time $X_1$ (for example, 30 minutes) after T is not less than the minimum power generation amount $W_{min}$ of the fuel cell system. When Yes, the operation control means 19 advances the process to Step S311. When No, the operation control means 19 assumes time (start-up time $T_s$—one minute) before T as the T, and returns the process to step S306.

Since steps S311 to S313 are identical to steps S8 to S10 in FIG. 2 of the first embodiment, they will not be described.

Figure 17:
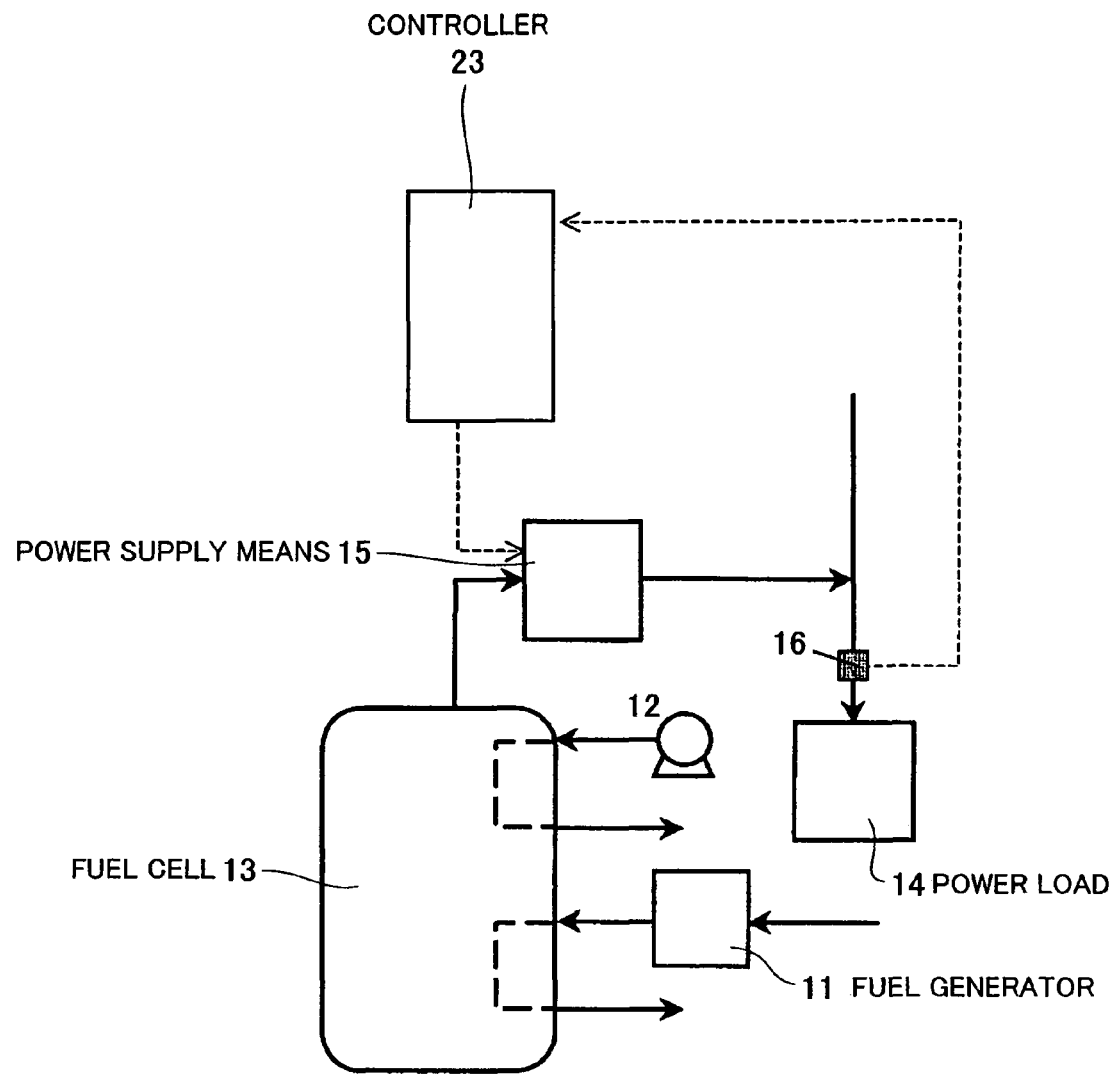
FIG. 17 is a view of a construction of the conventional fuel cell system.

After assuming the scheduled start-up time $T_1$, the scheduled power generation start time $T_2$, and the scheduled stop time $T_3$ of the fuel cell 13 in the manner as described above, the operation control means 19 advances the process to step after VII in FIG. 17 which follows VII in FIG. 16, and decides the scheduled start-up time $T_1$, the scheduled power generation start time $T_2$, and the scheduled stop time $T_3$ of the fuel cell 13, considering the amount of primary energy consumed.

Specifically, these steps are identical to the steps S111A to S120 in FIG. 7 of the fourth embodiment, and hence will not be described.

It should be noted that, in step S112A, the third calculating means 22 calculates or decides the amount of primary energy consumed when the fuel cell system starts-up according to the start-up time $T_s$ or the start-up mode to obtain fuel cell start-up primary energy amount $A_{FCS}$.

In accordance with the construction and operation of the fuel cell system of this embodiment, the start-up time $T_s$ and the fuel cell start-up primary energy amount $A_{FCS}$ are predictively calculated according to the temperature condition of the fuel cell system. Therefore, in addition to the effects described ion the fourth embodiment, the fuel cell system can be operated while further inhibiting wasteful energy consumption.

Alternatively, after assuming the scheduled start-up time $T_1$, the scheduled power generation start time $T_2$, and the scheduled stop time $T_3$ of the fuel cell 13, in steps after VII in FIG. 17, the scheduled start-up time $T_1$, the scheduled power generation start time $T_2$, and the scheduled stop time T3 of the fuel cell 13 may be decided considering the $CO_2$ generation amount by the operation in steps S111B to S120B in FIG. 8 of the fifth embodiment. It should be noted that, in step S112B, the third calculating means 22 calculates or decides the amount of $CO_2$ generated when the fuel cell system starts-up according to the start-up time $T_s$ or the start-up mode to obtain fuel cell start-up $CO_2$ generation amount $B_{FCS}$.

Thereby, the start-up time $T_s$ and the fuel cell start-up $CO_2$ generation amount $B_{FCS}$ are predictively calculated according the temperature condition of the fuel cell system, in addition to the effects described in the fifth embodiment. Therefore, the fuel cell system can be operated while inhibiting the $CO_2$ generation amount and contributing to prevention of global warming.

Alternatively, after assuming the scheduled start-up time $T_1$, the scheduled power generation start time $T_2$, and the scheduled stop time $T_3$ of the fuel cell 13, in steps after VII in FIG. 17, the scheduled start-up time $T_1$, the scheduled power generation start time $T_2$, and the scheduled stop time $T_3$ of the fuel cell 13 may be decided considering the cost by the operation in steps S111C to S120C in FIG. 9 of the sixth embodiment. It should be appreciated that in step S112C, the third calculating means 22 calculates or decides the cost necessary when the fuel cell system starts-up, according to the start-up time $T_s$ or the start-up mode to obtain fuel cell start-up cost $C_{FCS}$.

Thereby, the start-up time $T_s$ and the fuel cell start-up cost $C_{FCS}$ are predictively calculated according to the temperature condition of the fuel cell system, in addition to the effects described in the sixth embodiment. Therefore, the fuel cell system can be operated more economically.

As used herein, the controller is meant to include not only a single controller but a controller group configured to execute a control in cooperation with one another. So, the controller 23 may be configured such that a plurality of controllers are distributed and may be configured to control the fuel cell system in cooperation with one another.

The power generation efficiency $E_{WE}$, the heat recovery efficiency $E_{WH}$, the primary energy amount $A_{GFCB}$ per unit feed gas, the primary energy amount $A_{EB}$ per unit power, the $CO_2$ generation amount $B_{GFCB}$ per unit feed gas, the $CO_2$ generation amount $B_{EB}$ per unit power, the metered fare $C_{GFCB}$ of the feed gas, the metered fare $C_{EB}$ of the power system, the fuel cell start-up primary energy amount $A_{FCS}$, the fuel cell start-up $CO_2$ generation amount $B_{FCS}$, the fuel cell start-up cost $C_{FCS}$, the primary energy amount $A_{GHB}$ per unit heating calorie of the heat supply system 35, the $CO_2$ generation amount $B_{GHB}$ per unit calorie of the heat supply system 35, the metered fare $C_{GHB}$ of the heat supply system 35, the heat supply system heat efficiency $E_H$ and the start-up time $T_s$ may be preset in the controller 23, or the controller 23 may be equipped with an input means (not shown) by which these data are input to be stored and updated in the respective means within the controller 23 which use these data.

The primary energy amount $A_{GFCB}$ per unit feed gas may be represented by, weight units of coal oil or by calorie units.

The $CO_2$ generation amount $B_{GFCB}$ per unit feed gas may be represented by weight units of coal oil or by calorie units The $CO_2$ generation amount $B_{EB}$ per unit power can be calculated in advance or be gained from power system company according to the type of power generation equipment of the power system and the heat efficiency of the power generation equipment and power transmission equipment.

In order to allow the power value predicting means 18 and the calorie value predicting means 34 to construct the power value data and the calorie value data, it is necessary to store the power values and calorie values in the power value storage means 17 and the calorie value storage means 33, respectively. This storage typically requires a time period about fifteen days to a month after the power value and the calorie value start to be detected. So, the operation control means 19 decides the scheduled start-up time $T_1$, the scheduled power generation start time $T_2$, and the scheduled stop time $T_3$ after an elapse of the time period of about fifteen days to a month after installation of the fuel cell system. Alternatively, before installation of the fuel cell system, the power values of the electric power and calorie values of the heat which are to be supplied to the equipment may be detected in advance and histories thereof may be pre-stored in the power value storage means 17 and the calorie value storage means 33, respectively.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function maybe varied substantially without departing from the spirit of the invention and all modifications which come within the scope of the appended claims are reserved.

INDUSTRIAL APPLICABILITY

The fuel cell system of the present invention is useful as a fuel cell system and a fuel cell cogeneration system capable of operating considering energy resources, environmental load or economy.

The invention claimed is:

1. A fuel cell system comprising:
   a fuel cell;
   a load value detecting means configured to detect a load value of a load of electric power or heat which is generated by equipment supplied with the electric power or the heat from said fuel cell system;
   a load value storage means configured to store a history of the load value detected by said load value detecting means;
   a load value predicting means configured to predict a load value which is going to be generated based on the history of the load value and to store the predicted load value as load value data; and
   an operation control means configured to decide scheduled start-up time of said fuel cell based on the load value data predicted by said load value predicting means.

2. The fuel cell system according to claim 1, wherein the load value is a power value of a power load of the equipment supplied with the electric power from said fuel cell system, and the load value data is power value data.

3. The fuel cell system according to claim 2, further comprising:
   a calculating means configured to calculate an amount of primary energy consumed to supply the electric power;
   wherein said calculating means calculates the amount of primary energy, based on the power value data for a predetermined time period, for a case where said fuel cell supplies the electric power and for a case where a power system separate from the fuel cell system supplies the electric power, and
   said operation control means compares values calculated by said calculating means and decides start time of the time period as the scheduled start-up time when the value calculated for the case where said power system supplies the electric power is larger than the value calculated for the case where said fuel cell supplies the electric power.

4. The fuel cell system according to claim 3, wherein said calculating means calculates the amount of the primary energy consumed to supply the electric power from said fuel cell, considering an amount of a primary energy consumed to start-up said fuel cell.

5. The fuel cell system according to claim 4, wherein said calculating means calculates the amount of the primary energy consumed to start-up said fuel cell, based on a temperature of said fuel cell.

6. The fuel cell system according to claim 3, further comprising:
a fuel generator configured to generate a fuel containing hydrogen from a material,
wherein said calculating means calculates the amount of the primary energy consumed to supply the electric power from said fuel cell, considering an amount of a primary energy consumed to start-up said fuel generator.

7. The fuel cell system according to claim 6, wherein said calculating means calculates the amount of the primary energy consumed to start-up said fuel generator, based on a temperature of said fuel generator.

8. The fuel cell system according to claim 3, further comprising:
an input means by which the value to be calculated by said calculating means is selected from the primary energy.

9. The fuel cell system according to claim 3, further comprising:
a display means:
wherein a difference in the amount of primary energy is calculated using the calculated values of said calculating means, for a case where said fuel cell supplies the electric power and for a case where said power system supplies the electric power, and said display means displays the difference.

10. The fuel cell system according to claim 3, further comprising:
a heat storage means configured to recover waste heat from said fuel cell and to store the heat; and
a heat supply means configured to supply the heat stored in said heat storage means to outside,
wherein said calculating means further calculates an amount of heat recovered by said heat storage means, and an amount of the primary energy consumed to supply the heat from an external heat supply means, based on the power value data for the time period, thereby calculating an amount of primary energy for a case where said fuel cell supplies the electric power and the heat and for a case where said power system supplies the electric power and said external heat supply means supplies the heat, and
wherein said operation control means compares values calculated by said calculating means decides start time of the time period as the scheduled start-up time when the value calculated for the case where said power system and said external heat supply means supply the electric power and the heat, respectively, is larger than the value calculated for the case where said fuel cell supplies the electric power and the heat.

11. The fuel cell system according to claim 1, wherein the scheduled start-up time is updated for each predetermined update time.

12. The fuel cell system according to claim 1, further comprising:
a display means configured to display the scheduled start-up time.

13. The fuel cell system according to claim 1, wherein said display means is configured to display a history of past operation.

14. The fuel cell system according to claim 1, further comprising:
a heat storage means configured to recover waste heat from said fuel cell and to store the heat;
a heat supply means configured to supply the heat stored in said heat storage means to outside; and
a stored heat amount detecting means configured to detect an amount of the heat stored in said heat storage means,
wherein the load value is a calorie value of a heat load of the equipment supplied with the heat from said fuel cell system, and the load value data is calorie value data.

15. The fuel cell system according to claim 14, further comprising:
a calculating means configured to calculate an amount of primary energy consumed to supply the heat and the electric power,
wherein said calculating means calculates the amount of primary energy based on the calorie value data for a predetermined time period for a case where said fuel cell supplies the electric power and the heat and for a case where said power system and said external heat supply means supply the electric power and the heat, respectively, and
wherein said operation control means compares values calculated by said calculating means and decides start time of the time period as the scheduled start-up time when the value calculated for the case where said power system and said external heat supply means supply the electric power and the heat, respectively, is larger than the value calculated for the case where said fuel cell supplies the heat and the electric power.

16. The fuel cell system according to claim 15, wherein said calculating means calculates the amount of the primary energy consumed to supply the electric power and the heat from said fuel cell, considering an amount of the primary energy consumed to start-up said fuel cell.

17. The fuel cell system according to claim 16, wherein said calculating means calculates the amount of the primary energy consumed to start-up said fuel cell, based on a temperature of said fuel cell.

18. The fuel cell system according to claim 15, further comprising:
a fuel generator configured to generate a fuel containing hydrogen from a material,
wherein said calculating means calculates the amount of the primary energy consumed to supply the electric power and the heat from said fuel cell, considering an amount of the primary energy consumed to start-up said fuel generator.

19. The fuel cell system according to claim 18, wherein said calculating means calculates the amount of the primary energy consumed to start-up said fuel generator, based on a temperature of said fuel generator.

20. The fuel cell system according to claim 15, further comprising:
an input means by which the value to be calculated by said calculating means is selected from the primary energy.

21. The fuel cell system according to claim 15, further comprising:
a display means:
wherein a difference in the amount of primary energy is calculated using the calculated values of the calculating means, for the case where said fuel cell supplies the electric power and the heat and for the case where said power system and said external heat supply means supply the electric power and the heat, respectively, and said display means displays the difference.

22. The fuel cell system according to claim 1, further comprising:
a heat storage means configured to recover waste heat from said fuel cell and to store the heat; a heat supply means configured to supply the heat stored in said heat storage means to outside;
a stored heat amount detecting means configured to detect an amount of the heat stored in said heat storage means; and
a selecting means configured to select the load value from a calorie value of a heat load of the equipment supplied with the heat from said fuel cell system or a power value of a power load of the equipment supplied with the electric power from said fuel cell system, and to thereby select power value data or calorie value data as the load value data.

23. The fuel cell system according to claim 22, wherein said load value storage means stores the load value such that the load value in a case where a user is at home and the load value in a case where the user is away from home are distinguished from each other, and
wherein said selecting means selects determination of the scheduled start-up time of said fuel cell from determination based on the power value data in the case where the user is at home, determination based on the power value data in the case where the user is away from home, determination based on the calorie value data in the case where the user is at home, and determination based on the calorie value data in the case where the user is away from home.

24. The fuel cell system according to claim 1, further comprising:
an operation time setting means capable of, as desired, setting the scheduled start-up time of said fuel cell.

25. The fuel cell system according to claim 2, further comprising:
a calculating means configured to calculate an amount of carbon dioxide generated by supplying the electric power;
wherein said calculating means calculates the amount of carbon dioxide, based on the power value data for a predetermined time period, for a case where said fuel cell supplies the electric power and for a case where said power system supplies the electric power, and
said operation control means compares values calculated by said calculating means and decides start time of the time period as the scheduled start-up time when the value calculated for the case where said power system supplies the electric power is larger than the value calculated for the case where said fuel cell supplies the electric power.

26. The fuel system according to claim 25, wherein said calculating means calculates the amount of carbon dioxide generated by supplying the electric power from said fuel cell, considering the amount of carbon dioxide generated at the start-up of said fuel cell.

27. The fuel cell system according to claim 26, wherein said calculating means calculates the amount of carbon dioxide generated at the start-up of said fuel cell, based on a temperature of said fuel cell.

28. The fuel cell system according to claim 25, wherein said calculating means calculates the amount of carbon dioxide generated by supplying the electric power from said fuel cell, considering an amount of carbon dioxide generated at the start-up of said fuel cell system.

29. The fuel cell system according to claim 25, further comprising:
a fuel generator configured to generate a fuel containing hydrogen from a material,
wherein said calculating means calculates the amount of carbon dioxide generated by supplying the electric power from said fuel cell, considering an amount of carbon dioxide generated at the start-up of said fuel generator.

30. The fuel cell system according to claim 29, wherein said calculating means calculates the amount of carbon dioxide generated at the start-up of said fuel generator, based on a temperature of said fuel generator.

31. The fuel cell system according to claim 25, further comprising:
a heat storage means configured to recover waste heat from said fuel cell and to store the heat; and
a heat supply means configured to supply the heat stored in said heat storage means to outside,
wherein said calculating means further calculates an amount of heat recovered by said heat storage means, and an amount of carbon dioxide generated by supplying the heat from said external heat supply means, based on the power value data for the time period, thereby calculating an amount of carbon dioxide for a case where said fuel cell supplies the electric power and the heat and for a case where said power system supplies the electric power and said external heat supply means supplies the heat, and
wherein said operation control means compares values calculated by said calculating means and decides start time of the time period as the scheduled start-up time when the value calculated for the case where said power system and said external heat supply means supply the electric power and the heat, respectively, is larger than the value calculated for the case where said fuel cell supplies the electric power and the heat.

32. The fuel cell system according to claim 25, further comprising:
a display means:
wherein a difference in the amount of carbon dioxide is calculated using the calculated values of said calculating means, for a case where said fuel cell supplies the electric power and for a case where said power system supplies the electric power, and said display means displays the difference.

33. The fuel cell system according to claim 25, further comprising:
an input means by which the value to be calculated by said calculating means is selected from carbon dioxide.

34. The fuel cell system according to claim 2, further comprising:
a calculating means configured to calculate a cost necessary to supply the electric power;
wherein said calculating means calculates the cost, based on the power value data for a predetermined time period, for a case where said fuel cell supplies the electric power and for a case where said power system supplies the electric power, and
said operation control means compares values calculated by said calculating means and decides start time of the time period as the scheduled start-up time when the value calculated for the case where said power system supplies the electric power is larger than the value calculated for the case where said fuel cell supplies the electric power.

35. The fuel system according to claim 34, wherein said calculating means calculates the cost necessary to supply the electric power form from said fuel cell, considering a cost necessary to start-up said fuel cell.

36. The fuel cell system according to claim 35, wherein said calculating means calculates the cost necessary to start up said fuel cell, based on a temperature of said fuel cell.

37. The fuel cell system according to claim 34, wherein said calculating means calculates the cost necessary to supply the electric power from said fuel cell, considering a cost necessary to start-up said fuel cell system.

38. The fuel cell system according to claim 34, further comprising:
a fuel generator configured to generate a fuel containing hydrogen from a material,
wherein said calculating means calculates the cost necessary to supply the electric power from said fuel cell, considering a cost necessary to start-up said fuel generator.

39. The fuel cell system according to claim 38, wherein said calculating means calculates the cost necessary to start-up said fuel generator, based on a temperature of said fuel generator.

40. The fuel cell system according to claim 34, further comprising:
an input means by which the value to be calculated by said calculating means is selected from the cost.

41. The fuel cell system according to claim 34, further comprising:
a display means:
wherein a difference in the cost is calculated using the calculated values of said calculating means, for a case where said fuel cell supplies the electric power and for a case where said power system supplies the electric power, and said display means displays the difference.

42. The fuel cell system according to claim 34, further comprising:
a heat storage means configured to recover waste heat from said fuel cell and to store the heat; and
a heat supply means configured to supply the heat stored in said heat storage means to outside,
wherein said calculating means further calculates an amount of heat recovered by said heat storage means, and a cost necessary to supply the heat from said external heat supply means, based on the power value data for the time period, thereby calculating a cost for a case where said fuel cell supplies the electric power and the heat and for a case where said power system supplies the electric power and said external heat supply means supplies the heat, and
wherein said operation control means compares values calculated by said calculating means and decides start time of the time period as the scheduled start-up time when the value calculated for the case where said power system and said external heat supply means supply the electric power and the heat, respectively, is larger than the value calculated for the case where said fuel cell supplies the electric power and the heat.

43. The fuel cell system according to claim 15, wherein said calculating means calculates the amount of primary energy consumed to supply the electric power and the heat from said fuel cell, considering an amount of the primary energy consumed to start-up said fuel system.

44. The fuel cell system according to claim 14, further comprising:
a calculating means configured to calculate an amount of,
wherein said calculating means calculates the amount of carbon dioxide based on the calorie value data for a predetermined time period for a case where said fuel cell supplies the electric power and the heat and for a case where said power system and said external heat supply means supply the electric power and the heat, respectively, and
wherein said operation control means compares values calculated by said calculating means and decides start time of the time period as the scheduled start-up time when the value calculated for the case where said power system and said external heat supply means supply the electric power and the heat, respectively, is larger than the value calculated for the case where said fuel cell supplies the heat and the electric power.

45. The fuel cell system according to claim 44, further comprising:
an input means by which the value to be calculated by said calculating means is selected from the carbon dioxide.

46. The fuel cell system according to claim 44, further comprising:
a display means:
wherein a difference in the amount of carbon dioxide is calculated using the calculated values of the calculating means, for the case where said fuel cell supplies the electric power and the heat and for the case where said power system and said external heat supply means supply the electric power and the heat, respectively, and said display means displays the difference.

47. The fuel cell system according to claim 44, wherein said calculating means calculates the amount of carbon dioxide generated by supplying the electric power from said fuel cell, considering an amount of carbon dioxide generated at the start-up of said fuel cell system.

48. The fuel cell system according to claim 44, wherein said calculating means calculates the amount of carbon dioxide generated by supplying the electric power and the heat from said fuel cell considering an amount of carbon dioxide generated at the start-up of said fuel cell, or a cost necessary to start-up said fuel cell.

49. The fuel cell system according to claim 48, wherein said calculating means calculates the amount of carbon dioxide generated at the start-up of said fuel cell, based on a temperature of said fuel cell.

50. The fuel cell system according to claim 44, further comprising:
a fuel generator configured to generate a fuel containing hydrogen from a material,
wherein said calculating means calculates the amount of carbon dioxide generated by supplying the electric power from said fuel cell, considering an amount of carbon dioxide generated at the start-up of said fuel generator.

51. The fuel cell system according to claim 50, wherein said calculating means calculates the amount of carbon dioxide generated at the start-up of said fuel generator, based on a temperature of said fuel generator.

52. The fuel cell system according to claim 14, further comprising:
a calculating means configured to calculate a cost necessary to supply the heat and the electric power,
wherein said calculating means calculates the cost based on the calorie value data for a predetermined time period for a case where said fuel cell supplies the electric power and the heat and for a case where said power system and said external heat supply means supply the electric power and the heat, respectively, and
wherein said operation control means compares values calculated by said calculating means and decides start time of the time period as the scheduled start-up time when the value calculated for the case where said power system and said external heat supply means supply the electric power and the heat, respectively, is larger than the value calculated for the case where said fuel cell supplies the heat and the electric power.

53. The fuel cell system according to claim 52, wherein said calculating means calculates the cost necessary to supply the electric power and the heat from said fuel cell, considering a cost necessary to start-up said fuel cell.

54. The fuel cell system according to claim 53, wherein said calculating means calculates the cost necessary to start up said fuel cell, based on a temperature of said fuel cell.

55. The fuel cell system according to claim 52, wherein said calculating means calculates the cost necessary to supply the electric power from said fuel cell, considering a cost necessary to start-up said fuel cell system.

56. The fuel cell system according to claim 52, further comprising:
   a fuel generator configured to generate a fuel containing hydrogen from a material,
   wherein said calculating means calculates the cost necessary to supply the electric power from said fuel cell, considering a cost necessary to start-up said fuel generator.

57. The fuel cell system according to claim 56, wherein said calculating means calculates the cost necessary to start-up said fuel generator, based on a temperature of said fuel generator.

58. The fuel cell system according to claim 52, further comprising:
   a display means:
   wherein a difference in the cost is calculated using the calculated values of the calculating means, for the case where said fuel cell supplies the electric power and the heat and for the case where said power system and said external heat supply means supply the electric power and the heat, respectively, and said display means displays the difference.

59. The fuel cell system according to claim 52, further comprising:
   an input means by which the value to be calculated by said calculating means is selected from the cost.

60. A method of operating a fuel cell system comprising a fuel cell, comprising the steps of:
   (a) detecting a load value of a load of electric power or heat which is generated by equipment supplied with the electric power or the heat from said fuel cell system;
   (b) storing a history of the load value detected in step (a);
   (c) predicting a load value which is going to be generated based on the history of the load value and storing the predicted load value as load value data; and
   (d) deciding scheduled start-up time of said fuel cell based on the load value data predicted in step (c).

61. The method according to claim 60, wherein the load value is a power value of a power load of the equipment supplied with the electric power from said fuel cell system, and the load value data is power value data.

62. The method according to claim 61, further comprising the steps of:
   (e) calculating an amount of primary energy consumed to supply the electric power, based on the power value data for a predetermined time period, for a case where said fuel cell supplies the electric power and for a case where said power system supplies the electric power; and
   (f) comparing values calculated in step (e) and deciding start time of the time period as the scheduled start-up time when the value calculated for the case where said power system supplies the electric power is larger than the value calculated for the case where said fuel cell supplies the electric power.

63. The method according to claim 62, further comprising the steps of:
   (g) calculating an amount of the waste heat which is recovered from said fuel cell and stored in a heat storage means, and an amount of the primary energy consumed to supply the amount of the recovered waste heat from an external heat supply means, based on the power value data for the time period, thereby calculating an amount of primary energy for a case where said fuel cell supplies the electric power and a heat supply means supplies the heat from the heat storage means and for a case where said power system supplies the electric power and said external heat supply means supplies the heat; and
   (h) comparing values calculated in step (g) and deciding start time of the time period as the scheduled start-up time when the value calculated for the case where said power system and said external heat supply means supply the electric power and the heat, respectively, is larger than the value calculated for the case where said fuel cell supplies the electric power and the heat supply means supplies the heat.

64. The method according to claim 61, further comprising the steps of:
   (e) calculating an amount of carbon dioxide generated by supplying the electric power, based on the power value data for a predetermined time period, for a case where said fuel cell supplies the electric power and for a case where said power system supplies the electric power; and
   (f) comparing values calculated in step (e) and deciding start time of the time period as the scheduled start-up time when the value calculated for the case where said power system supplies the electric power is larger than the value calculated for the case where said fuel cell supplies the electric power.

65. The method according to claim 64, further comprising the steps of:
   (g) calculating an amount of the waste heat which is recovered from said fuel cell and stored in a heat storage means, and an amount of carbon dioxide generated by supplying the amount of the recovered waste heat from an external heat supply means, based on the power value data for the time period, thereby calculating an amount of carbon dioxide for a case where said fuel cell supplies the electric power and a heat supply means supplies the heat from the heat storage means and for a case where said power system supplies the electric power and said external heat supply means supplies the heat; and
   (h) comparing values calculated in step (g) and deciding start time of the time period as the scheduled start-up time when the value calculated for the case where said power system and said external heat supply means supply the electric power and the heat, respectively, is larger than the value calculated for the case where said fuel cell supplies the electric power and the heat supply means supplies the heat.

66. The method according to claim 61, further comprising the steps of:
   (e) calculating a cost necessary to supply the electric power, based on the power value data for a predetermined time period, for a case where said fuel cell supplies the electric power and for a case where said power system supplies the electric power; and (f) comparing values calculated in step (e) and deciding start time of the time period as the scheduled start-up time when the value calculated for the case where said power system supplies the electric power is larger than the value calculated for the case where said fuel cell supplies the electric power.

67. The method according to claim 66, further comprising the steps of:
(g) calculating an amount of the waste heat which is recovered from said fuel cell and stored in a heat storage means, and a cost necessary to supply the amount of the recovered waste heat from an external heat supply means, based on the power value data for the time period, thereby calculating a cost for a case where said fuel cell supplies the electric power and a heat supply means supplies the heat from the heat storage means and for a case where said power system supplies the electric power and said external heat supply means supplies the heat; and
(h) comparing values calculated in step (g) and deciding start time of the time period as the scheduled start-up time when the value calculated for the case where said power system and said external heat supply means supply the electric power and the heat, respectively, is larger than the value calculated for the case where said fuel cell supplies the electric power and the heat supply means supplies the heat.

* * * * *